US011252482B2

(12) United States Patent
Lee et al.

(10) Patent No.: US 11,252,482 B2
(45) Date of Patent: Feb. 15, 2022

(54) BROADCAST RECEIVER AND METHOD FOR LAUNCHING BROADCASTER APPLICATION BASED ON URL IN APPLICATION SIGNALING INFORMATION

(71) Applicant: LG ELECTRONICS INC., Seoul (KR)

(72) Inventors: Jinwon Lee, Seoul (KR); Kyoungsoo Moon, Seoul (KR); Woosuk Ko, Seoul (KR); Minsung Kwak, Seoul (KR); Seungjoo An, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/859,379

(22) Filed: Apr. 27, 2020

(65) Prior Publication Data

US 2020/0260158 A1    Aug. 13, 2020

Related U.S. Application Data

(63) Continuation of application No. 15/486,608, filed on Apr. 13, 2017, now Pat. No. 10,674,232, which is a continuation of application No. PCT/KR2015/010649, filed on Oct. 8, 2015.
(Continued)

(51) Int. Cl.
*H04N 21/81* (2011.01)
*H04N 7/08* (2006.01)
(Continued)

(52) U.S. Cl.
CPC ......... *H04N 21/8166* (2013.01); *H04N 7/015* (2013.01); *H04N 7/08* (2013.01);
(Continued)

(58) Field of Classification Search
None
See application file for complete search history.

(56) References Cited

U.S. PATENT DOCUMENTS 9,407,946 B2   8/2016   Park et al.
2006/0190320 A1   8/2006   Dewa
(Continued)

FOREIGN PATENT DOCUMENTS

KR   10-2006-0082430 A   7/2006
KR   10-2007-0097185 A   10/2007
(Continued)

*Primary Examiner* — Omar S Parra
(74) *Attorney, Agent, or Firm* — Birch, Stewart, Kolasch & Birch, LLP

(57) ABSTRACT

A digital broadcast receiver for processing data of a broadcaster application, includes a tuner configured to receive a broadcast signal including video data for a broadcast program and application signaling information, wherein the application signaling information includes a URL (Uniform Resource Locator) of an entry page of the broadcaster application for providing an interactive service; a frequency deinterleaver configured to frequency deinterleave the video data and the application signaling information; and a time deinterleaver configured to perform time deinterleaving differently based on mode information, wherein the time deinterleaver comprises a twisted block deinterleaver, and wherein the twisted block deinterleaver is configured to deinterleave one or more FEC (Forward Error Correction) blocks comprising the video data and the application signaling information based on at least one TI (Time Interleaving) block interleaved by a TI scheme.

8 Claims, 42 Drawing Sheets

Related U.S. Application Data

(60) Provisional application No. 62/063,908, filed on Oct. 14, 2014.

(51) Int. Cl.
  *H04N 7/015* (2006.01)
  *H04N 21/6547* (2011.01)
  *H04N 21/2362* (2011.01)
  *H04N 21/61* (2011.01)
  *H04N 21/858* (2011.01)

(52) U.S. Cl.
  CPC ..... *H04N 21/2362* (2013.01); *H04N 21/6125* (2013.01); *H04N 21/6547* (2013.01); *H04N 21/8173* (2013.01); *H04N 21/8586* (2013.01)

(56) References Cited

U.S. PATENT DOCUMENTS

| | | | |
|---|---|---|---|
| 2011/0167468 A1* | 7/2011 | Lee | H04N 21/4758 725/132 |
| 2013/0047178 A1 | 2/2013 | Moon et al. | |
| 2013/0271653 A1 | 10/2013 | Kim et al. | |
| 2014/0208375 A1 | 7/2014 | Fay et al. | |
| 2015/0237417 A1 | 8/2015 | Kitazato | |

FOREIGN PATENT DOCUMENTS

| | | |
|---|---|---|
| KR | 10-2008-0026036 A | 3/2008 |
| KR | 10-2010-0081714 A | 7/2010 |
| WO | WO 2012/099428 A2 | 7/2012 |

* cited by examiner

FIG. 7
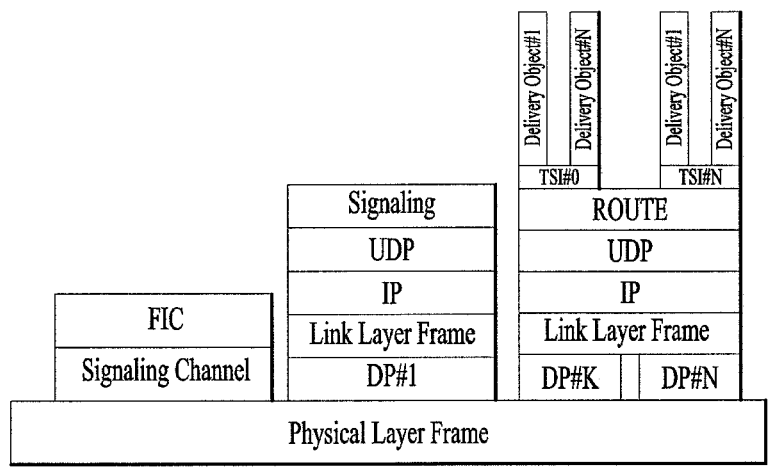
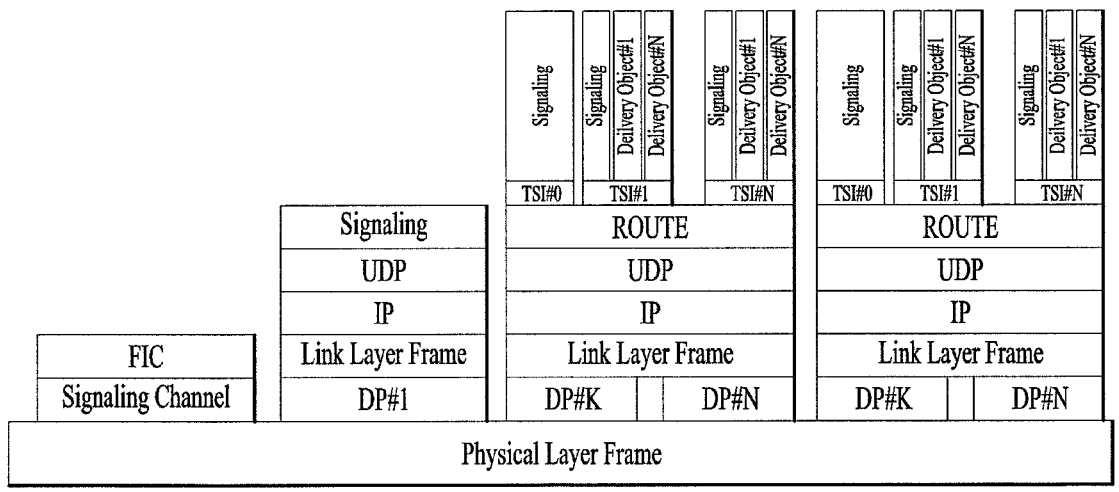
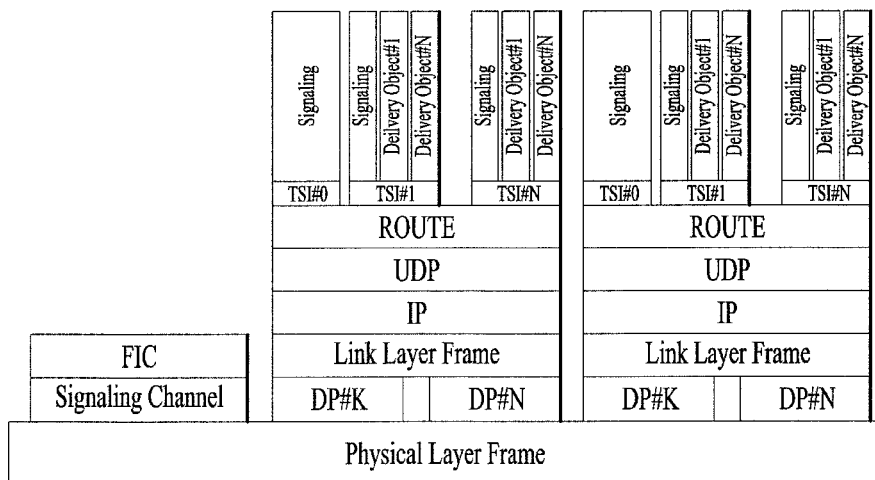

FIG. 8

| Syntax | No. Bits | Format |
|---|---|---|
| FIC(){ | | |
|     FIC_protocol_version | 8 | uimsbf |
|     TSID | 16 | uimsbf |
|     FIC_data_version | 8 | uimsbf |
|     num_partitions | 8 | uimsbf |
|     for (i-0; i<num_partitions; i++) { | | |
|         partition_protocol_version | 8 | uimsbf |
|         base_DP_ID | 8 | uimsbf |
|         base_DP_version | 8 | uimsbf |
|         num_services | 8 | uimsbf |
|         For (j=0; j<num_services; j++) { | | |
|             service_id | 16 | uimsbf |
|             channel_number | 16 | uimsbf |
|             service_category | 5 | uimsbf |
|             short_service_name_length /*m*/ | 3 | uimsbf |
|             short_service_name | 16*m | var |
|             service_status | 2 | uimsbf |
|             service_distribution | 2 | uimsbf |
|             sp_indicator | 1 | uimsbf |
|             reserved | 3 | '111' |
|         } | | |
|     } | | |
| } | | |

FIG. 9

| Syntax | No. Bits | Format |
|---|---|---|
| FIC(){ | | |
|     FIC_protocol_version | 8 | uimsbf |
|     transport_stream_ID | 16 | uimsbf |
|     FIC_data_version | 8 | uimsbf |
|     num_partitions | 8 | uimsbf |
|     for (i-0 ; i<num_partitions ; i++) { | | |
|         partition_id | 8 | uimsbf |
|         partition_protocol_version | 8 | uimsbf |
|         num_services | 8 | uimsbf |
|         For (j=0 ; j<num_services ; j++) { | | |
|             service_id | 16 | uimsbf |
|             service_data_version | 8 | uimsbf |
|             channel_number | 16 | uimsbf |
|             service_category | 5 | uimsbf |
|             short_service_name_length /*m*/ | 3 | uimsbf |
|             short_service_name | 16*m | var |
|             service_status | 3 | uimsbf |
|             service_distribution | 2 | uimsbf |
|             sp_indicator | 1 | uimsbf |
|             IP_version_flag | 1 | bslbf |
|             source_IP_address_flag | 1 | bslbf |
|             num_transport_sessions | 8 | uimsbf |
|             for ( int k=0; k< num_transport_sessions;k ++){ | | |
|                 if( source_IP_address_flag ) | | |
|                     source_IP_addr | 32 or 128 | uimsbf |
|                 dest_IP_addr | 32 or 128 | uimsbf |
|                 dest_UDP_port | 16 | uimsbf |
|                 LSID_DP | 8 | uimsbf |
|                 service_signaling_flag | 8 | uimsbf |
|             [transport_session_descriptors] | | |
|             } | | |
|         [service_descriptors] | | |
|         } | | |
|     [partition_descriptors] | | |
|     } | | |
|     [FIC_descriptors] | | |
| } | | |

FIG. 11

| Syntax | No. Bits | Format |
|---|---|---|
| FIC(){ | | |
|   FIC_protocol_version | 8 | uimsbf |
|   transport_stream_ID | 16 | uimsbf |
|   FIC_data_version | 8 | uimsbf |
|   num_partitions | 8 | uimsbf |
|   for (i-0 ; i<num_partitions ; i++) { | | |
|     partition_id | 8 | uimsbf |
|     partition_protocol_version | 8 | uimsbf |
|     num_services | 8 | uimsbf |
|     For (j=0 ; j<num_services ; j++) { | | |
|       service_id | 16 | uimsbf |
|       service_data_version | 8 | uimsbf |
|       channel_number | 16 | uimsbf |
|       service_category | 5 | uimsbf |
|       short_service_name_length /*m*/ | 3 | uimsbf |
|       short_service_name | 16*m | var |
|       service_status | 3 | uimsbf |
|       service_distribution | 2 | uimsbf |
|       sp_indicator | 1 | uimsbf |
|       IP_version_flag | 1 | bslbf |
|       source_IP_address_flag | 1 | bslbf |
|       num_transport_sessions | 8 | uimsbf |
|       for ( int k=0; k< num_transport_sessions;k ++){ | | |
|         if( source_IP_address_flag ) | | |
|           source_IP_addr | | |
|         dest_IP_addr | | |
|         dest_UDP_port | 32 or 128 | uimsbf |
|         LSID_DP | 32 or 128 | uimsbf |
|         service_signaling_flag | 16 | uimsbf |
|         if( service_signaling_flag == TRUE){ | 8 | uimsbf |
|           signaling_data_version | 8 | uimsbf |
|           signaling_DP | | |
|         } | | |
|         [transport_session_descriptors] | 8 | uimsbf |
|       } | 8 | uimsbf |
|       [service_descriptors] | | |
|     } | | |
|     [partition_descriptors] | | |
|   } | | |
|   [FIC_descriptors] | | |
| } | | |

FIG. 13

LCT Session Instance Dscription Semantics

| Element or Attribute Name | | | Use | Description |
|---|---|---|---|---|
| LSID | | | | LCT Session Instance Description |
| | @version | | O | Version of this LCT Session Instance Description. The version is increased by one when the descriptor is updated. The received LSID with highest version number is the currently valid version. |
| | @validFrom | | O | The date and time from which the LSID is valid. The validFrom attribute may or may not be present. If not present, the receiver can assume the LSID version is valid immediately. |
| | @expiration | | O | The date and time when the LSID expires. The expiration attribute may or may not be present. If not present the receiver can assume the LSID is valid for all time, or until it receives a newer LSID with an associated expiration value. |
| | TransportSession | | 1..N | Provides information about LCT transport sessions |
| | | @ tsi | M | Specifies the transport session identifier. The session identifiers must not be 0. |
| | | SourceFlow | 0 ... 1 | Provides information of a source flow carried on this tsi |
| | | RepairFlow | 0 ... 1 | Provides information of a repair flow carried on the tsi. |

Legend:

For attributes: M=Mandatory, O=Optional, OD=Optional with Default Value, CM=Conditionally Mandatory.

For elements: < minOccurs >...< maxOccurs > (N=unbounded)

Note that the conditions only holds without using xlink:href . If linking is used, then all attributes are "optional" and < minOccurs = 0 >

Elements are bold; attributes are non bold and preceded with an @.

FIG. 14

| Element or Attribute Name | | | Use | Description |
|---|---|---|---|---|
| SourceFlow | | | | defines a source flow in session |
| | EFDT | | 0...1 | If provided, it specifies the details of the file delivery data. This is the extended File Delivery Table(FDT) instance.<br>The EFDT may either be embedded or may be provided as a reference. If provided as a reference the EFDT may be updated independently of the LSID. |
| | | @idRef | O? | Identification of the EFDT, it can be represented as a URI by the corresponding Transport Session. |
| | | @realtime | OD<br>default: false | If not present it is false. If present and set to true, LCT packets contain extension headers including timestamps that express the presentation time of the included delivery object. |
| | | @ minBufferSize | O | Defines the maximum amount of data that needs to be stored in the receiver. This value may be present if @ realtime is set to true. |
| | ApplicationIdentifier | | 0...1 | May provide additional information that can be mapped to the application that is carried in this transport session, e.g. Representation ID of a DASH content or the Adaptation Set parameters of a DASH Representation in order to select the LCT transport session for rendering. |
| | PayloadFormat | | 1...N | Defines payload formats of ROUTE packets carrying the objects of the source flow |
| | | @codePoint | OD<br>default=0 | Defines what CodePoint value is used for this payload. This is the value of the CP field in the LCT header. When signalling this this value, the delivery of the object can follow the rules below. |
| | | @deliveryObjectFormat | M | Specifies the payload format of the delivery object |
| | | @fragmentation | OD<br>default=0 | Specifies the type of fragmentation<br>0 : arbitrary<br>1: application specific (sample based)<br>2 : application specific (e.g., a collection of boxes) |
| | | @deliveryOrder | OD<br>default=0 | Specifies the ordering of delivery of objects<br>0 : arbitrary<br>1: in -order delivery<br>2: in -order delivery of media samples and prior to movie fragment box |
| | | @ sourceFecPayloadID | OD<br>default=1 | Defines the format of the Source FEC Payload ID. The following values can be defined :<br>- 0: the source FEC payload ID is absent and the entire delivery object is contained in this packet.<br>- 1: the source FEC payload ID is 32 bit and expresses the start offset in the object.<br>- 2: FECParameters defines the Format of the Source FEC Payload ID. |
| | | FECParameters | 0...1 | Defines the FEC parameters . This includes the FEC-encoding -id, the instance -id, etc. It is specifically used to signal the applied Source FEC Payload ID. |

Legend:
For attributes: M=Mandatory, O=Optional, OD=Optional with Default Value, CM=Conditionally Mandatory.
For elements: <minOccurs >...< maxOccurs > (N=unbounded)
Note that the conditions only holds without using xlink:href . If linking is used, then all attributes are "optional"
and < minOccurs = 0 >
Elements are bold; attributes are non bold and preceded with an @.

FIG. 15

| Element or Attribute Name | Use | Description |
|---|---|---|
| EFDT | | extended FDT instance descriptor |
| @ idRef | 0...1 | Identification of the EFDT, |
| @version | O | Version of this extended FDT instance descriptor. The version if increased by one when the descriptor is updated. The received EFDT with highest version number is the currently valid version. |
| @ maxExpiresDelta | O | The maximum expiry time for an object in the Transport Session after sending the first packet associated to this object. |
| @ maxTransportSize | O | The maximum transport size of any object described by this EFDT. |
| FileTemplate | 0...1 | Specifies the file URL or file template in the body |

Legend:

For attributes: M=Mandatory, O=Optional, OD=Optional with Default Value, CM=Conditionally Mandatory.

For elements: <minOccurs>...< maxOccurs> (N=unbounded)

Note that the conditions only holds without using xlink:href. If linking is used, then all attributes are "optional" and < minOccurs = 0 >

Elements are bold ; attributes are non-bold and preceded with an @.

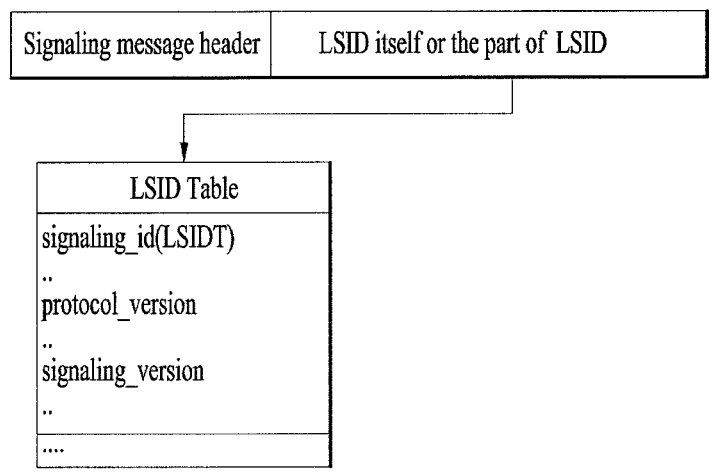

FIG. 17
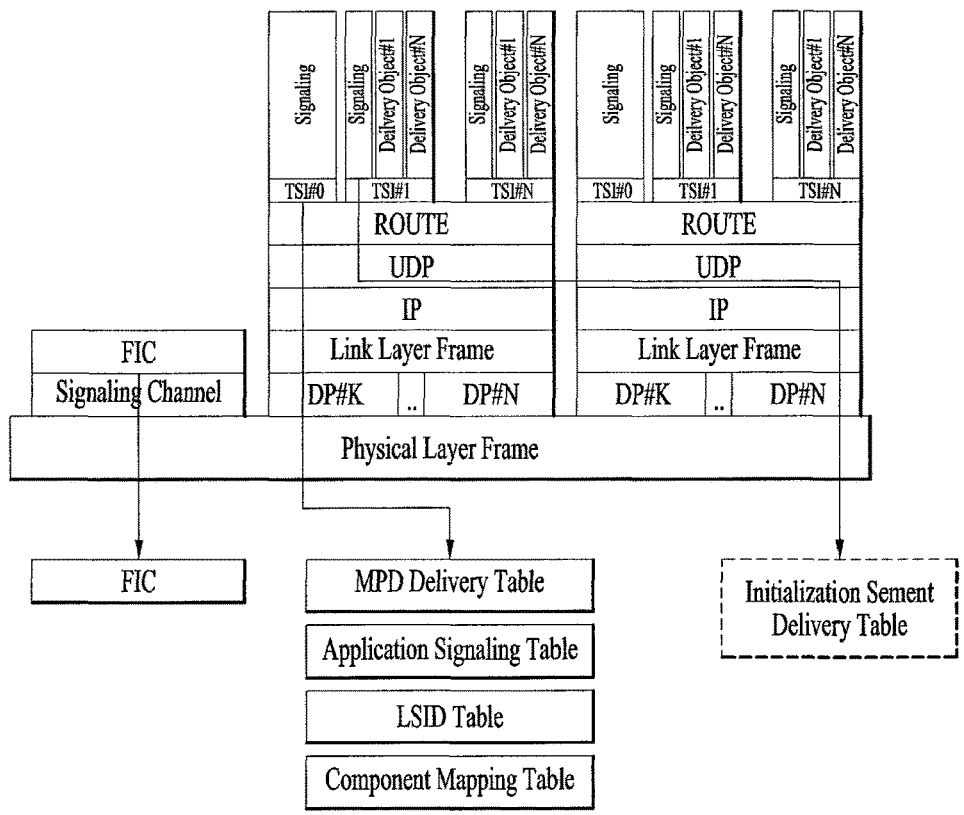
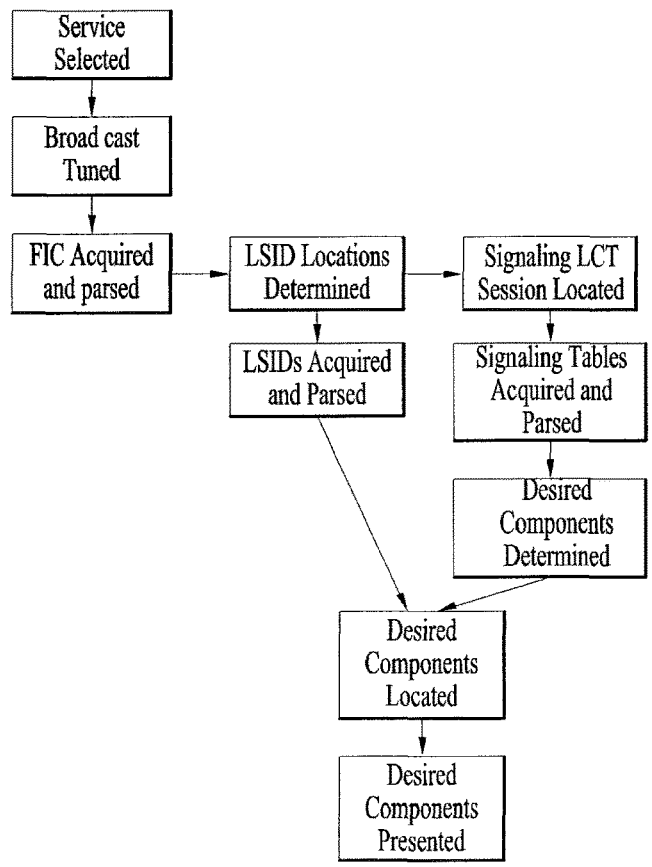

FIG. 18

| Example Trigger | Function |
|---|---|
| xbc.tv/e12 | Pre-load TPT from identified location (online at http://xbc.tv/e12 or within associated FLUTE session). |
| xbc.tv/e12?s=10 | Pre-load TPT from identified location (online at http://xbc.tv/e12 or within associated FLUTE session), with smoothing parameter value 10 seconds. |
| xbc.tv/e12?v=2 | Pre-load TPT from the identified location and indicate the version number of this TPT. If a TPT had previously been acquired from this location and it was associated with a different version number, the receiver should reload this new version. |
| xbc.tv/e12?m=5a33 | Identify the location of TPT and establish the current Media Time of the associated content. |
| xbc.tv/e12?e=7.5 | Identify the location of TPT and signal the immediate execution of the TPT interactive event with eventID value 5 associated with the TDO that has appID value 7. |
| xbc.tv/e12?e=8.3&t=77ee | Identify the location of TPT and signal the execution at Media Time 77ee of the TPT interactive event with eventID value 3 associated with the TDO that has appID value 8. |
| xbc.tv/e12?m=5a33&s=12 | Identify the location of TPT and establish the current Media Time of the associated content, with smoothing parameter value 12 seconds. |
| xbc.tv/e12?m=44b1&c=xbc55 | Identify the location of the Direct Execution DO to be launched, establish the current Media Time of the associated content, and identify the content. |
| xbc.tv/e12?e=8.3&st=77ee&et=80ee | Identify the location of TPT and signal the execution at Media Time 77ee of the TPT interactive event with eventID value 3 associated with the TDO that has appID vaue 8 and has a end time 80ee. |

FIG. 19

| Element/Attribute | Cardinality | Data Type | Description and Value |
|---|---|---|---|
| TPT | | | |
|   @majorProtocolVersion | 0..1 | integer 0..15 | Major Protocol Version, default="1" |
|   @minorProtocolVersion | 0..1 | integer 0..15 | Minor Protocol version, default="0" |
|   @id | 1 | anyURI | segment_id = domain_name/program_id |
|   @tptVersion | 1 | unsignedByte | Data version of this TPT |
|   @expireDate | 0..1 | dateTime | Date after which this TPT will not be used |
|   @updatingTime | 0..1 | unsignedShort | Time interval to check for TPT updates |
|   @serviceID | 0..1 | unsignedShort | NRT service_id |
|   @baseURL | 0..1 | anyURI | Base URL for all relative URLs in TPT |
|   Capabilities | 0..1 | nrt:CapabilitiesType | Essential capabilities for the segment associated with this TPT |
|   LiveTrigger | 0..1 | | Info on Internet live trigger delivery |
|     @URL | 1 | anyURI | URL of server for live triggers |
|     @pollPeriod | 0..1 | unsignedByte | Short polling period in seconds |
|   TDO | 1..N | | TDO (app) for the segment associated with this TPT |
|     @appID | 1 | unsignedShort | Application ID of this app, unique within the scope of this TPT |
|     @appType | 0..1 | integer 0-165 | Application type (default: 1="TDO") |
|     @appName | 0..1 | String | Display name (for viewer launch consent) |
|     @globalID | 0..1 | anyURI | Globally unique app ID |
|     @appVersion | 0..1 | unsignedByte | Version of this app |
|     @cookieSpace | 0..1 | unsignedByte | Persistent storage needed; default=0 |
|     @frequencyOfUse | 0..1 | integer 0..15 | Code values per Table 6.3 |
|     @expireDate | 0..1 | dateTime | Expire date for caching this app |
|     @testTDO | 0..1 | Boolean | Flag for test app; default="false" |
|     @availInternet | 0..1 | Boolean | Default="true" |
|     @availBroadcast | 0..1 | Boolean | Default="true" |
|     URL | 1..N | anyURI | App URL(s) |
|       @entry | 0..1 | Boolean | Indicator of entry point; default = "false" |
|     Capabilities | 0..1 | nrt:CapabilitiesType | Essential capabilities to present this app |
|     ApplicationBoundary | 0..1 | | Extensions to app boundary |
|       OriginURL | 1..N | anyURI | Origin to be added to app boundary |
|     ContentItem | 0..N | | Content item used by this app |
|       URL | 1..N | anyURI | URL(s) of content item |
|         @entry | 0..1 | Boolean | Indicator of entry point; default = "false" |
|       @updatesAvail | 0..1 | Boolean | Default="false" |
|       @pollPeriod | 0..1 | unsignedByte | Short polling period in seconds |
|       @size | 0..1 | 24-bit integer | Size of content item, in kilobytes |
|       @availInternet | 0..1 | Boolean | Default="true" |
|       @availBroadcast | 0..1 | Boolean | Default="true" |
|     Event | 1..N | | Event targeted to this TDO |
|       @eventID | 1 | unsignedShort | Unique identifier of this Event element within the scope of the TDO element. |
|       @action | 1 | String | Allowed values are "prep", "exec", "susp", and "kill" |
|       @destination | 0..1 | unsignedByte | Device to which the event is directed (primary screen, second screen, or both) |
|       @diffusion | 0..1 | unsignedByte | Period for applying diffusion, in seconds |
|       Data | 0..N | base64Binary | Data to be used for this event |
|         @dataID | 1 | unsignedShort | Unique identifier of this Data element within the scope of the Event element. |

FIG. 20

| Element or Attribute Name | Use | Description |
|---|---|---|
| EventStream | | specifies event Stream |
| @xlink:href | O | specifies a reference to an external EventStream element |
| @xlink:actuate | OD<br><br>default: onRequest | specifies the processing instructions, which can be either "onLoad" or "onRequest".<br><br>This attribute shall not be present if the @xlink:href attribute is not present. |
| @schemeIdUri | M | identifies the message scheme. The string may use URN or URL syntax. When a URL is used, it is recommended to also contain a month-date in the form mmyyyy; the assignment of the URL must have been authorized by the owner of the domain name in that URL on or very close to that date. A URL may resolve to an Internet location, and a location that does resolve may store a specification of the message scheme. |
| @value | O | specifies the value for the event stream element. The value space and semantics must be defined by the owners of the scheme identified in the @schemeIdUri attribute. |
| @timescale | O | specifies the timescale in units per seconds to be used for the derivation of different real-time duration values in the Event elements.<br><br>If not present on any level, it shall be set to 1. |
| Event | 0 ... N | specifies one event. For details see Table 25.<br><br>Events in Event Streams shall be ordered such that their presentation time is non-decreasing. |
| Legend:<br>    For attributes: M=Mandatory, O=Optional, OD=Optional with Default Value, CM=Conditionally Mandatory.<br>    For elements: <minOccurs>...<maxOccurs> (N=unbounded)<br>Elements are bold; attributes are non-bold and preceded with an @. | | |

FIG. 21

| Element or Attribute Name | Use | Description |
|---|---|---|
| Event | | specifies an event and contains the message of the event, formatted as a string. The content of this element depends on the event scheme. |
| @presentationTime | OD default: 0 | specifies the presentation time of the event relative to the start of the Period.<br><br>The value of the presentation time in seconds is the division of the value of this attribute and the value of the @timescale attribute.<br><br>If not present, the value of the presentation t is 0. |
| @duration | O | specifies the presentation duration of the event.<br><br>The value of the duration in seconds is the division of the value of this attribute and the value of the @timescale attribute.<br><br>If not present, the value of the duration is unknown. |
| @id | O | specifies an identifier for this instance of the event. Events with equivalent content and attribute values in the Event element shall have the same value for this attribute. |
| Legend:<br>    For attributes: M=Mandatory, O=Optional, OD=Optional with Default Value, CM= Conditionally Mandatory.<br>    For elements: <minOccurs>...<maxOccurs> (N=unbounded)<br>Elements are bold; attributes are non-bold and preceded with an @. | | |

FIG. 22

```
aligned(8) class DASHEventMessageBox extends FullBox('emsg', version = 0, flags = 0){
    string                          scheme_id_uri;
    string      value;
    unsigned int(32)  timescale;
    unsigned int(32)  presentation_time_delta;
    unsigned int(32)  event_duration;
    unsigned int(32)  id;
    unsigned int(8)   message_data[];
    }
}
```

FIG. 23

| Application Trigger Property | MPD Events | Inband Events (emsg) |
|---|---|---|
| Application Trigger Type | @schemeIdUri + "U+0020" (SPACE character) + @value | scheme_id_uri + "U+0020" (SPACE character) + value |

FIG. 24

| @value | Description |
|---|---|
| tpt | Signals the location of TPT |
| status | Signals the lifecycle of applications (e.g., preparing, launching, terminating, suspending, etc.) |
| action | Signals the actions taken by applications |
| mediatime | Signals media time |

FIG. 25

| Application Trigger Property | MPD Events | Inband Events (emsg) |
|---|---|---|
| tptID | @id | id |
| TPT location | Message | message_data |

FIG. 26

| Application Trigger Property | MPD Events | Inband Events (emsg) |
|---|---|---|
| startTime | @presentationTime | event_presentation_time_data |
| tptID | @id | id |
| status (preparing, launching, terminating, suspending, etc.) | Message | message_data |

FIG. 27

| Application Trigger Property | MPD Events | Inband Events (emsg) |
|---|---|---|
| startTime | @presentationTime | event_presentation_time_data |
| endTime | startTime + @duration | startTime + event_duration |
| segmentID (tptID) | @id | id |
| Trigger message | Message | message_data |

| Application Trigger Property | MPD Events | Inband Events (emsg) |
|---|---|---|
| mediaTime | @presentationTime | event_presentation_time_data |
| segmentID (tptID) | @id | id |

| 0 1 2 3 4 5 6 7 8 9 0 1 2 3 4 5 | 6 7 8 9 0 | 1 2 3 | 4 5 6 7 8 9 0 1 |
|---|---|---|---|
| length | FT | T | f i | A | frag_counter |
| MPU_sequence_number |||
| DU_length | DU_Header .... ||
| DU payload .... |||

Application Signaling Track

FIG. 33

| Syntax | Value | No. of bits | Mnemonic |
|---|---|---|---|
| signalling_message () { <br>     message_id <br>     version <br>     if(message_id != PA_message && message_id !=MPI_message) { <br>     langth <br>     } else { <br>     langth <br>     } <br>     extension <br>     message_payload{ <br>     } | | 16 <br> 16 <br><br> 16 <br><br><br> 32 | uimsbf <br> uimsbf <br><br> uimsbf <br><br><br> uimsbf |

FIG. 34

| Value | Description |
|---|---|
| 0x0000 | PA messages |
| 0x0001 ~ 0x000F | MPI messages.<br><br>For a Package, 16 contiguous values are allocated to MPI messages.<br><br>If the value % 16 equals 15, the MPI message carries complete PI.<br><br>If the value %16 equals N where N = 0 ~ 14, the MPI message carries Subset-N PI. |
| 0x0010 ~ 0x001F | MPT messages.<br><br>For a package, 16 contiguous values are allocated to MPT messages.<br><br>If the value % 16 equals 15, the MPT message carries complete MPT.<br><br>If the value %16 equals N where N = 0 ~ 14, the MPT message carries Subset-N MPT. |
| 0x0200 | CRI messages |
| 0x0201 | DCI messages |
| 0x0202 | AL_FEC messgages |
| 0x0203 | HRBM messages |
| 0x0204 ~ 0x7FFF | reserved for ISO use |
| 0x8000 | Application Signaling messages |
| 0x8001 ~ 0xFFFF | reserved for private use |

FIG. 35

| Syntax | Value | No. of bits | Mnemonic |
|---|---|---|---|
| application_signaling_message() { | | | |
|     message_id | 0x8000 | 16 | uimsbf |
|     version | | 8 | uimsbf |
|     length | | 32 | uimsbf |
|     extension { | | | |
|         number_of_tables | N1 | 8 | uimsbf |
|         for(i=0;i<N1;i++) { | | | |
|             table_id | | 8 | uimsbf |
|             table_version | | 8 | uimsbf |
|             table_length | | 16 | uimsbf |
|         } | | | |
|     } | | | |
|     message_payload { | | | |
|         for(i=0;i<N1;i++) { | | | |
|             application_signaling_table() | | | |
|         } | | | |
|     } | | | |
| } | | | |

FIG. 36

| Syntax | No. of Bits | Format |
|---|---|---|
| application_signaling_table() { | | |
|     table_id | 8 | uimsbf |
|     version | 8 | uimsbf |
|     length | 16 | uimsbf |
|     trigger_type | 8 | uimsbf |
|     for (i=0;i<length-1; i++){ | | |
|         URI_character | 8 | uimsbf |
|     } | | |
|     reserved | var | |
| } | | |

FIG. 37

| Value | Description |
|---|---|
| 00000001 | Signals the location of TPT-tpt |
| 00000010 | Signals the lifecycle of applications (e.g., preparing, launching, terminating, suspending, etc.) - Status |
| 00000100 | Signals the actions taken by applications - action |
| 00001000 | Signals media time - mediatime |
| 00010000 | Signals all trigger information - trigger |
| 00100000 ~ 10000000 | Reserved |

FIG. 38

| Value | Description |
|---|---|
| 0x0000 | PA messages |
| 0x0001 ~ 0x000F | MPI messages.<br><br>For a Package, 16 contiguous values are allocated to MPI messages.<br><br>If the value % 16 equals 15, the MPI message carries complete PI.<br><br>If the value %16 equals N where N = 0 ~ 14, the MPI message carries Subset-N PI. |
| 0x0010 ~ 0x001F | MPT messages.<br><br>For a package, 16 contiguous values are allocated to MPT messages.<br><br>If the value % 16 equals 15, the MPT message carries complete MPT.<br><br>If the value %16 equals N where N = 0 ~ 14, the MPT message carries Subset-N MPT. |
| 0x0200 | CRI messages |
| 0x0201 | DCI messages |
| 0x0202 | AL_FEC messgages |
| 0x0203 | HRBM messages |
| 0x0204 ~ 0x7FFF | reserved for ISO use |
| 0x8000 ~ 0x8004 | Application Signaling Message<br><br>0x8000: Signals the location of TPT – tpt<br><br>0x8001: Signals the lifecycle of applications (e.g., preparing, launching, terminating, suspending, etc.) – Status<br><br>0x8002: Signals the actions taken by applications – action<br><br>0x8003: Signals media time – mediatime<br><br>0x8004: Signals all trigger information – trigger |
| 0x8005 ~ 0x801F | Reserved |

FIG. 39

| Syntax | No. of Bits | Format |
|---|---|---|
| application_signaling_table() { | | |
|     table_id | 8 | uimsbf |
|     version | 8 | uimsbf |
|     length | 16 | uimsbf |
|     for (i=0; i<length-1; i++) { | 8 | uimsbf |
|         URI_character | | |
|     } | var | |
|     reserved | | |
| } | | |

FIG. 40

```
 0 1 2 3 4 5 6 7 8 9 0 1 2 3 4 5 6 7 8 9 0 1 2 3 4 5 6 7 8 9 0 1
|V=0|C|FEC|r|X|R|RES|    type    |         packet_id           |
|                          timestamp                           |
|                    packet_sequence_number                    |
|                        packet_counter                        |
|                     header_extension ....                    |
|                       payload data ....                      |
|                     source_FEC_payload_ID                    |
```

FIG. 41

```
 0 1 2 3 4 5 6 7 8 9 0 1 2 3 4 5 6 7 8 9 0 1 2 3 4 5 6 7 8 9 0 1
|V=0|C|FEC|r|X|R|RES|   type    |           packet_id           |
|                            timestamp                           |
|                       packet_sequence_number                   |
|                         packet_counter                         |
|                       header_extension ....                    |
|                         payload data ....                      |
|                       source_FEC_payload_ID                    |
```

(a)

```
 0 1 2 3 4 5 6 7 8 9 0 1 2 3 4 5 6 7 8 9 0 1 2 3 4 5 6 7 8 9 0 1
|           type            |              length               |
|                     header_extension_value ....                |
```

| Integer addLink(String uri, String linkMetadata) | | |
|---|---|---|
| Description | When successful, this method shall cause the receiver to add a Link to its list of Links. The integer return value of this method shall indicate whether or not the call was successful, and it shall provide the reason for failure if it failed, according to Table below. | |
| Arguments | uri | The input URI value shall be the URL that is to be saved as a Link. |
| | linkMetadata | The input linkMetadata value shall represent the metadata to be associated with the Link, in the form of a UTF-8 representation of an XML document with root element LinkMetadata conforming to the schema described by Table below. |

(a)

| Code Value | Meaning |
|---|---|
| 0 | Call succeeded; Link added |
| 1 | Call failed; syntax of uri argument invalid |
| 2 | Call failed; format of linkMetadata argument invalid |
| 3 | Call failed; upper limit on number of stored links exceeded |

(b)

| Element/Attribute | | | | Cardinality | XML data type | Description |
|---|---|---|---|---|---|---|
| LinkMetadata | | | | 1 | | |
| | @url | | | 1 | anyURI | URL to be saved as Link |
| | @title | | | 0..1 | string | Title of Link |
| | @majChanNum | | | 0..1 | unsignedShort | Major channel # where Link offered |
| | @minChanNum | | | 0..1 | unsignedShort | Minor channel # where Link offered |
| | @channelName | | | 0..1 | string | Name of channel where Link offered |
| | @programName | | | 0..1 | string | Name of program when Link offered |
| | @expiration | | | 0..1 | dateTime | Expiration date/time of Link |
| | @packagedApp | | | 0..1 | boolean | Flag for indicating a packaged app; default="false" |
| | @description | | | 0..1 | string | Description of the application |
| | Param | | | 0..1 | string | Query string |
| | | @title | | 0..1 | string | Title of parameter |
| | | @description | | 0..1 | string | Description of parameter |
| | Icon | | | 0..N | | |
| | | @source | | 1 | anyURI | Pointer to icon file |
| | | @width | | 0..1 | unsignedShort | Icon width, in pixels |
| | | @height | | 0..1 | unsignedShort | Icon height, in pixels |

(c)

Application content items:
  http(s)://app.example.com/index.html
  http(s)://app.example.com/assets/v1/base.css
  http(s)://app.example.com/assets/v1/app.js
  http(s)://app.example.com/services/inventory/data.json
  http(s)://app.example.com/assets/v1/logo.png Application content items:
   http(s)://app.example.com/index.html
   http(s)://app.example.com/assets/v1/base.css
   http(s)://app.example.com/assets/v1/app.js
   http(s)://app.example.com/services/inventory/data.json
   http(s)://app.example.com/assets/v1/logo.png

BROADCAST RECEIVER AND METHOD FOR LAUNCHING BROADCASTER APPLICATION BASED ON URL IN APPLICATION SIGNALING INFORMATION

CROSS-REFERENCE TO RELATED APPLICATIONS

This Application is a Continuation Application of co-pending U.S. patent application Ser. No. 15/486,608 filed Apr. 13, 2017, which is a Continuation Application of PCT International Application No. PCT/KR2015/010649 filed on Oct. 8, 2015, which claims priority under 35 U.S.C. 119(e) to U.S. Provisional Application No. 62/063,908, filed on Oct. 14, 2014, all of these applications are hereby expressly incorporated by reference into the present application. Further, the present application relates to another Continuation Application of U.S. patent application Ser. No. 15/486,608 filed Apr. 13, 2017, which is being filed on the same date as the present application.

BACKGROUND OF THE INVENTION

Field of the Invention

The present invention relates to a broadcast signal transmission device, a broadcast signal reception device, and broadcast transceiving methods.

Discussion of the Related Art

As analog broadcast signal transmission is terminated, various technologies for transmitting and receiving a digital broadcast signal have been developed. A digital broadcast signal is capable of containing a larger amount of video/audio data than an analog broadcast signal and further containing various types of additional data as well as video/audio data.

SUMMARY OF THE INVENTION

That is, a digital broadcast system may provide a high definition (HD) image, multi-channel audio, and various additional services. However, for digital broadcast, network flexibility obtained by considering data transmission efficiency for a large amount of data transmission, robustness of a transceiving network, and a mobile receiving apparatus needs to be enhanced.

To solve the aforementioned problems, a broadcast receiver according to an embodiment of the present invention includes: a signaling parser for receiving application signaling information including information about applications; an application manager for parsing application URL information including a URL of a position at which a specific application is acquired from the application signaling information; an application browser for receiving one or more application content items related to an application identified by the application URL information; and a storage for storing the received application content items.

The application browser may call application link information, and the application manager may parse the application link information from signaling information and control information in the application link information to be stored in the storage.

The application link information may include URI information indicating a URL stored as a link for an application and link metadata information including metadata related to the link.

The link metadata information may include @packagedApp information for indicating whether the application connected through the link is a packaged application or an application in the form of a widget.

The link metadata information may include @url information indicating a URL of an object for the application indicated by the link, @title information indicating a title of the link displayed to a user, or a Param element having values for discriminating a plurality of applications provided by the same application provider.

The application manager may receive a command for execution of a specific application from a user and deliver the link metadata information to the application browser, and the application browser may load application content items included in the specific application from the storage using the link metadata information.

The application browser may receive the application content items in non-real time through a broadcast network or receive the application content items through a broadband network.

A method of executing an application in a broadcast receiver according to an embodiment of the present invention includes: receiving application signaling information including information about applications; parsing application URL information including a URL of a position at which a specific application is acquired from the application signaling information; receiving one or more application content items related to an application identified by the application URL information; and storing the received application content items.

The method may further include: calling application link information; and parsing the application link information from signaling information and controlling information in the application link information to be stored in the storage.

The application link information may include URI information indicating a URL stored as a link for an application and link metadata information including metadata related to the link.

The link metadata information may include @packagedApp information for indicating whether the application connected through the link is a packaged application or an application in the form of a widget.

The link metadata information may include @url information indicating a URL of an object for the application indicated by the link, @title information indicating a title of the link displayed to a user, or a Param element having values for discriminating a plurality of applications provided by the same application provider.

The method may further include: receiving a command for execution of a specific application from a user; delivering the link metadata information to the application browser; and loading application content items included in the specific application from the storage using the link metadata information.

The receiving of the one or more application content items may include receiving the application content items in non-real time through a broadcast network or receiving the application content items through a broadband network.

According to the present invention, various broadcast services may be provided by processing data according to service properties and controlling quality of service (QoS) of each service or service component.

According to the present invention, transmission flexibility may be achieved by transmitting various broadcast services through the same radio frequency (RF) signal bandwidth.

According to the present invention, data transmission efficiency and transceiving robustness of a broadcast signal may be enhanced using a multiple-input multiple-output (MIMO) system.

According to the present invention, rapid service scan and service acquisition may be provided.

According to the present invention, location information on an associated component may be provided.

According to the present invention, service layer signaling may be selectively parsed using filtering information.

BRIEF DESCRIPTION OF THE DRAWINGS

FIG. 7 illustrates a method of transmitting signaling data in a next generation broadcast system according to an embodiment of the present invention.

FIG. 8 shows signaling data transmitted by a next generation broadcast system according to an embodiment of the present invention for rapid broadcast service scan of a receiver.

FIG. 9 shows signaling data transmitted by a next generation broadcast system according to an embodiment of the present invention for rapid broadcast service scan of a receiver.

FIG. 11 shows signaling data transmitted by a next generation broadcast system according to an embodiment of the present invention for rapid broadcast service scan of a receiver.

FIG. 13 shows a description of a transmission session instance of a next generation broadcast system according to an embodiment of the present invention.

FIG. 14 shows a SourceFlow element of a next generation broadcast system according to an embodiment of the present invention.

FIG. 15 shows an EFDT of a next generation broadcast system according to an embodiment of the present invention.

FIG. 17 shows a delivery structure of a signaling message of a next generation broadcast system according to an embodiment of the present invention.

FIG. 18 shows a trigger according to a trigger syntax of an embodiment of the present invention.

FIG. 19 shows a syntax of application signaling information according to an embodiment of the present invention.

FIG. 20 shows a syntax of an event stream element included in an MPD according to an embodiment of the present invention.

FIG. 21 shows a syntax of an event element of an event stream element included in the MPD according to an embodiment of the present invention.

FIG. 22 illustrates a syntax of an event message box for in-band event signaling according to an embodiment of the present invention.

FIG. 23 shows a matching relationship between a trigger property for signaling an application signaling information position and MPD elements and the event message box according to an embodiment of the present invention.

FIG. 24 shows a matching relationship between a trigger property for signaling an application state and MPD elements and the even message box according to an embodiment of the present invention.

FIG. 25 shows a matching relationship between a trigger property for signaling an application operation and MPD elements and the event message box according to an embodiment of the present invention.

FIG. 26 shows a matching relationship between a trigger property for signaling media time and MPD elements and the even message box according to an embodiment of the present invention.

FIG. 27 shows definition of a value attribute for signaling all trigger properties as one event according to an embodiment of the present invention.

FIG. 33 shows a syntax of an MMT signaling message according to another embodiment of the present invention.

FIG. 34 shows a relationship between a value of an identifier identifying an MMT signaling message and data signaled by the MMT signaling message according to another embodiment of the present invention.

FIG. 35 shows a syntax of a signaling message including application signaling information according to another embodiment of the present invention.

FIG. 36 shows a syntax of an application signaling table including application signaling information according to another embodiment of the present invention.

FIG. 37 shows a relationship between trigger type information included in an application signaling table and trigger properties included in triggers according to another embodiment of the present invention.

FIG. 38 shows a relationship between a value of an identifier identifying an MMT signaling message and data signaled by the MMT signaling message according to another embodiment of the present invention.

FIG. 39 shows a syntax of an application signaling table that does not include trigger type information according to another embodiment of the present invention.

FIG. 40 shows a structure of an MMTP packet according to another embodiment of the present invention.

FIG. 41 shows a structure of an MMTP packet and a syntax of a header extension field for application signaling information transmission according to another embodiment of the present invention.

FIG. 46 shows an application program interface (API) and metadata used for a receiver to execute an application according to an embodiment of the present invention.

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

In the specification, "signaling" refers to transmission/reception of service information (SI) provided by broadcast systems, Internet broadcast systems and/or broadcast/Internet convergence systems. The service information includes broadcast service information (e.g., ATSC-SI and/or DVB-SI) provided by existing broadcast systems.

In the specification, a "broadcast signal" is a concept including signals and/or data provided through interactive broadcast such as Internet broadcast, broadband broadcast, communication broadcast, data broadcast and/or video on demand (VOD) in addition to terrestrial broadcast, cable broadcast, satellite broadcast and/or mobile broadcast.

In the specification, a "PLP" refers to a specific unit carrying data belonging to a physical layer. Accordingly, "PLP" may be replaced by "data unit" or "data pipe" in the specification.

A hybrid broadcast service implemented through interoperation between broadcast networks and the Internet may be considered as one of powerful applications to be used in DTV services. The hybrid broadcast service transmits enhancement data associated with broadcast audio/video (A/V) content transmitted through terrestrial broadcast networks or part of the broadcast A/V content in real time such that a user can enjoy various types of content.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc.

Figure 1:
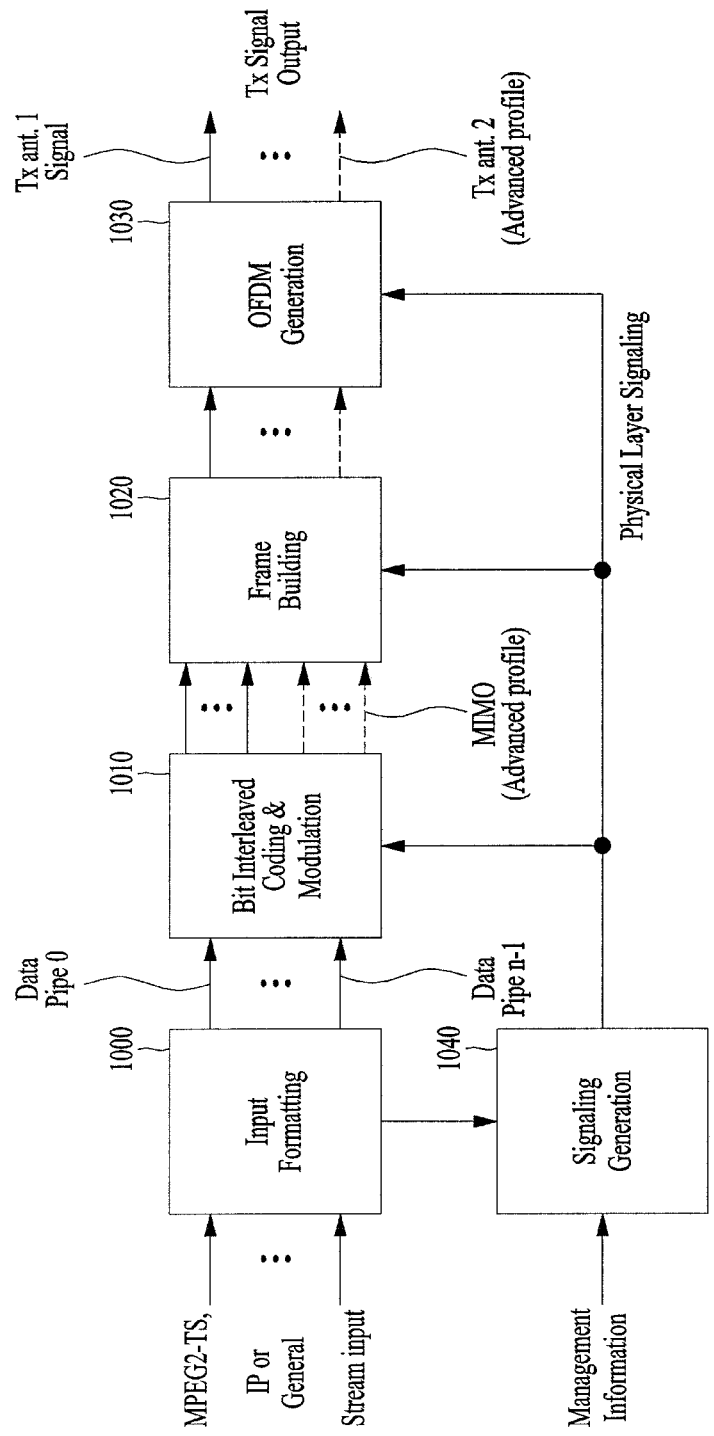
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
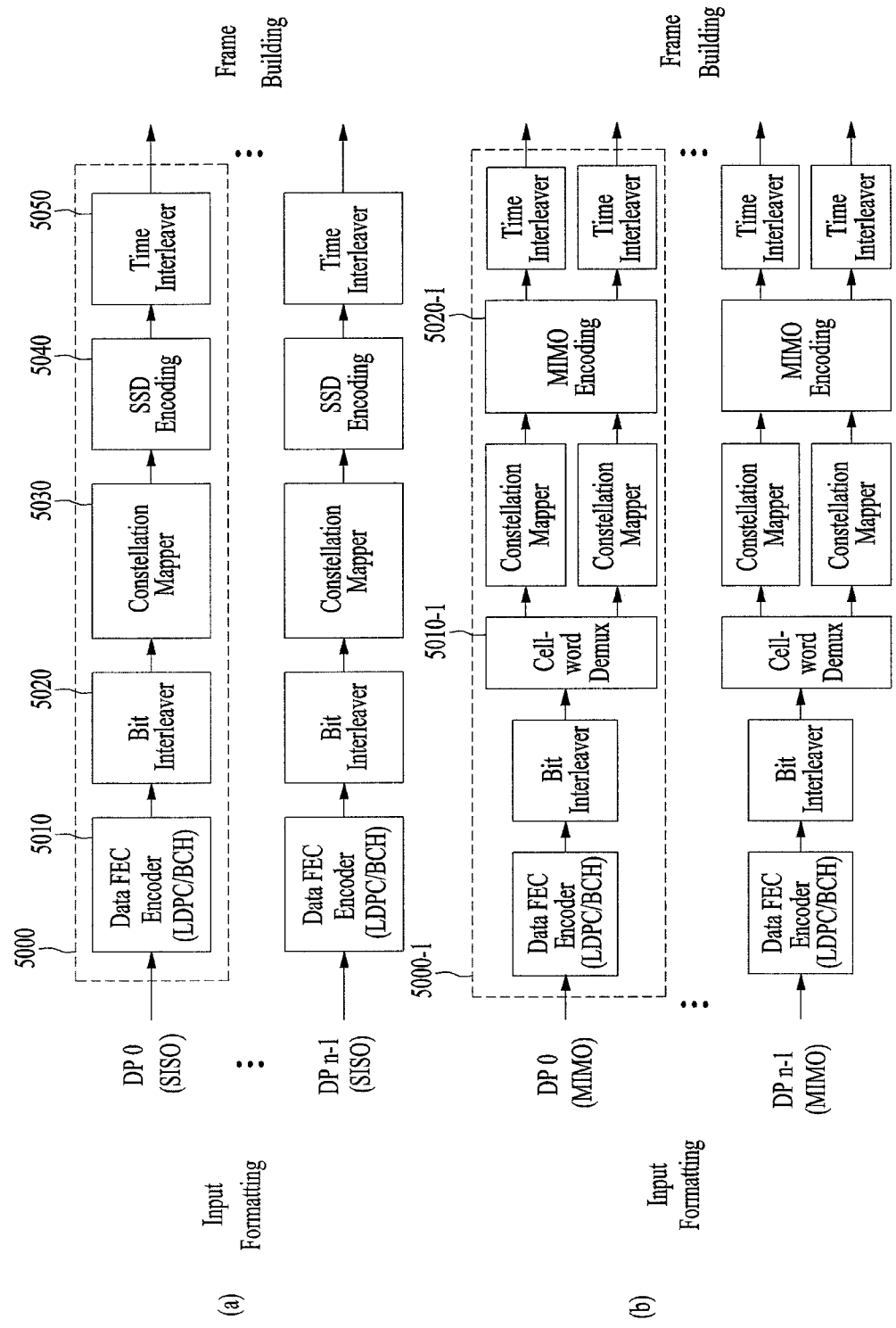
FIG. 2 illustrates a BICM block according to an embodiment of the present invention.

FIG. 2 illustrates a BICM block according to an embodiment of the present invention.

The BICM block illustrated in FIG. 2 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver.

However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

Figure 3:
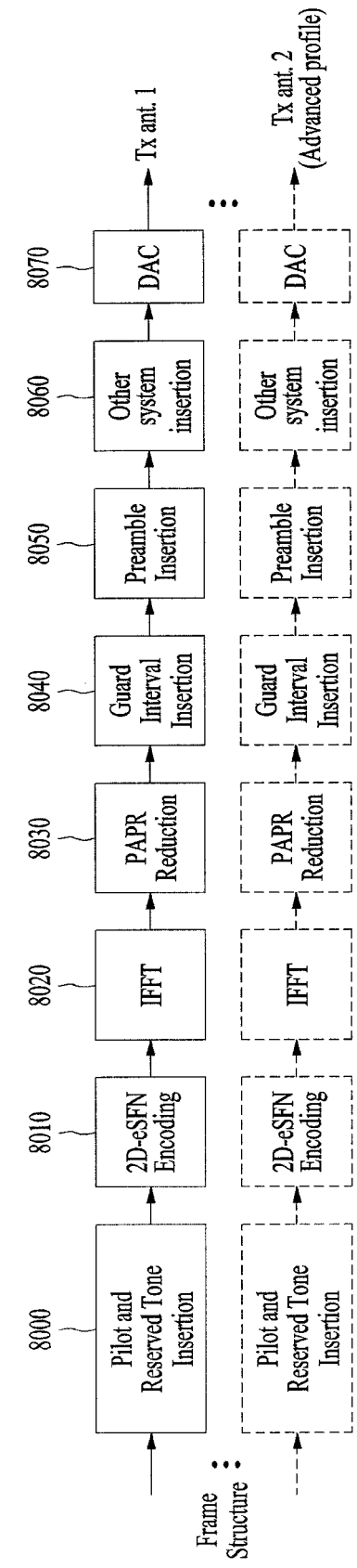
FIG. 3 illustrates an orthogonal frequency division multiplexing (OFDM) generation block according to an embodiment of the present invention.

FIG. 3 illustrates an OFDM generation block according to an embodiment of the present invention.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 3, the OFDM generation block can include a pilot and reserved tone insertion block 8000, a 2D-eSFN encoding block 8010, an IFFT (Inverse Quick Fourier Transform) block 8020, a PAPR reduction block 8030, a guard interval insertion block 8040, a preamble insertion block 8050, other system insertion block 8060 and a DAC block 8070.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

Figure 4:
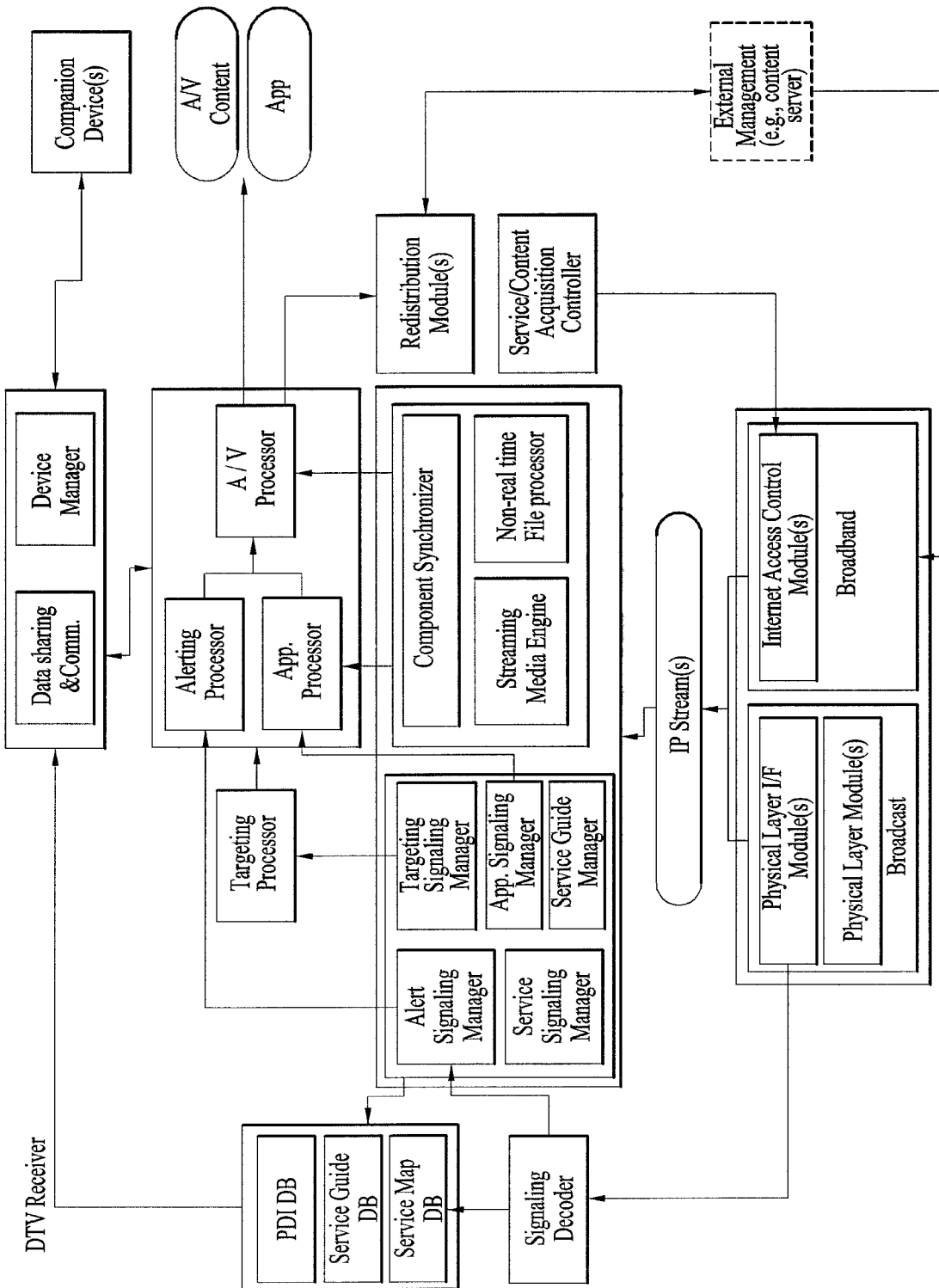
FIG. 4 illustrates a hybrid broadcast reception device according to an embodiment of the present invention.

FIG. 4 illustrates a hybrid broadcast reception device according to an embodiment of the present invention. The hybrid broadcast system may transmit a broadcast signal in conjunction with a terrestrial broadcast network and an Internet network. The hybrid broadcast reception device may receive a broadcast signal through a terrestrial broadcast network (broadcast) and an Internet network (broadband). The hybrid broadcast reception device may include a physical layer module, a physical layer I/F module, a service/content acquisition controller, an Internet access control module, a signaling decoder, a service signaling manager, a service guide manager, an App signaling manager, an alert signal manager, an alert signal parser, a targeting signal parser, a streaming media engine, a non-real-time file processor, a component synchronizer, a targeting processor, an application processor, an A/V processor, a device manager, a data sharing and communication unit, a redistribution module, a companion device and/or an external module.

The physical layer module(s) may receive and process broadcast-related signals through a terrestrial broadcast channel, convert the same into appropriate forms, and transmit the converted signals to the physical layer I/F module.

The physical layer I/F module(s) may acquire IP datagrams from the information obtained from the physical layer module. In addition, the physical layer I/F module may convert the acquired IP datagram or the like into a specific frame (for example, RS frame, GSE).

The service/content acquisition controller may perform control operations for acquiring services, content and signaling data associated therewith over a broadcast and/or broadband channel.

The Internet access control module(s) may control receiver operations to acquire services, content, and the like over a broadband channel.

The signaling decoder may decode the signaling information acquired over a broadcast channel or the like.

The service signaling manager may extract, parse, and manage signaling information related to service scan and services/content from the IP datagram and the like.

The service guide manager may extract announcement information from IP datagrams, manage an SG (Service Guide) database, and provide a service guide.

The App signaling manager may extract, parse, and manage signaling information related to application acquisition and the like from IP datagrams and the like.

The alert signal parser may extract, parse, and manage alerting related signaling information from IP datagrams and the like.

The targeting signal parser may extract, parse, and manage signaling information related to service/content personalization or targeting from IP datagrams and the like. The targeting signal parser may also deliver the parsed signaling information to the targeting processor.

The streaming media engine may extract and decode audio/video data for A/V streaming from IP datagrams and the like.

The non-real time file processor may extract, decode, and manage NRT data and file type data such as applications from IP datagrams and the like.

The component synchronizer may synchronize services and content such as streaming audio/video data and NRT data.

The targeting processor may process operations related to personalization of the service/content based on the targeting signaling data received from the targeting signal parser.

The application processor (App processor) may process application-related information, the status of a downloaded application and display parameters.

The A/V processor may perform audio/video rendering related operations based on decoded audio and video data, application data, and the like.

The device manager may perform connection and data exchange with an external device. The device manager may also perform management of external devices such as addition/deletion/update of operatively connectable external devices.

The data sharing and communication unit (Data Sharing & Comm.) may process information related to data transmission and exchange between the hybrid broadcast receiver and an external device.

Here, the data that may be transmitted and exchanged may be signaling, A/V data, and the like.

The redistribution module(s) may acquire related information about the next generation broadcast service and content when the broadcast receiver cannot directly receive the terrestrial broadcast signal. The redistribution module may also support acquisition of broadcast services and content by the next generation broadcast system when the broadcast receiver cannot directly receive the terrestrial broadcast signal.

The companion device(s) may be coupled to the broadcast receiver of the present invention to share audio, video, or signaling-containing data. The companion device may refer to an external device connected to the broadcast receiver.

An external management module (External Management) may refer to a module for providing broadcast service/content, for example, a next generation broadcast service/content server. The external module may refer to an external device connected to the broadcast receiver.

Figure 5:
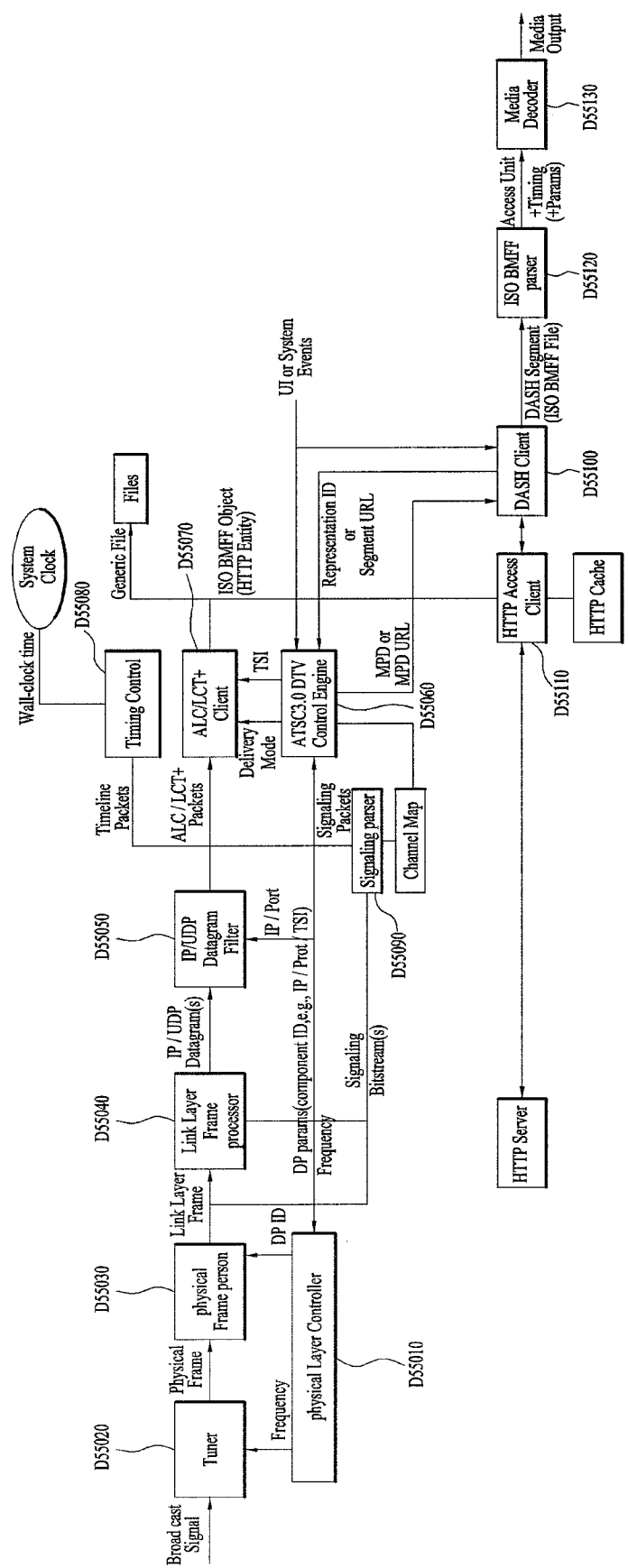
FIG. 5 is a block diagram illustrating a hybrid broadcast receiver according to an embodiment of the present invention.

FIG. 5 is a block diagram illustrating a hybrid broadcast receiver according to an embodiment of the present invention.

The hybrid broadcast receiver may receive the hybrid broadcast service through operative connection of terrestrial broadcast and broadband in the DTV service of the next generation broadcast system. The hybrid broadcast receiver may receive broadcast audio/video (A/V) content transmitted through a terrestrial broadcast and receive part of enhancement data or broadcast A/V content associated therewith in real time through broadband. In this specification, the broadcast audio/video (A/V) content may be referred to as media content.

The hybrid broadcast receiver may include a physical layer controller D55010, a tuner D55020, a physical frame parser D55030, a link layer frame parser D55040, an IP/UDP datagram filter D55050, an ATSC 3.0 DTV (Digital Television) Control Engine D55060, an ALC/LCT+ Client D55070, a timing control D55080, a signaling parser D55090, a DASH (Dynamic Adaptive Streaming over HTTP) client D55100, an HTTP access client D55110, an ISO BMFF parser D55120, and/or a media decoder D55130.

The physical layer controller D55010 may control operations of the tuner D55020, the physical frame parser D55030, and the like using radio frequency (RF) information about a terrestrial broadcast channel to be received by the hybrid broadcast receiver.

The tuner D55020 may receive and process broadcast related signals through a terrestrial broadcast channel and convert the same into an appropriate form. For example, the tuner D55020 may convert a received terrestrial broadcast signal into a physical frame.

The physical frame parser D55030 may parse the received physical frame and acquire a link layer frame through related processing.

The link layer parser D55040 may acquire link layer signaling from the link layer frame or perform related operations to acquire an IP/UDP datagram or an MPEG-2 TS. The link layer parser D55040 may output at least one IP/UDP datagram or the like.

The IP/UDP datagram filter D55050 may filter a specific IP/UDP datagram from at least one received IP/UDP datagram or the like. That is, the IP/UDP datagram filter D55050 may selectively filter an IP/UDP datagram selected by the ATSC 3.0 DTV control engine D55060 among the at least one IP/UDP datagram output from the link layer parser D55040. The IP/UDP datagram filter D55050 may output an application layer transport protocol packet such as ALC/LCT+.

The ATSC 3.0 DTV control engine D55060 may serve as an interface between modules included in each hybrid broadcast receiver. The ATSC 3.0 DTV control engine D55060 may also provide necessary parameters for each module, thereby controlling the operation of each module. In the present invention, the ATSC 3.0 DTV control engine D55060 may deliver a media presentation description (MPD) and/or an MPD URL to the DASH client D55100. In the present invention, the ATSC 3.0 digital television control engine D55060 may also deliver a delivery mode and/or a transport session identifier (TSI) to the ALC/LCT+ client D55070. Here, TSI may represent the identifier of a session for transmitting a transport packet including a signaling message such as MPD or MPD URL related signaling, for example, the identifier of a FLUTE session or an ALC/LCT+ session, which is an application layer transmission protocol. The TSI may correspond to the Asset id of MMT.

The ALC/LCT+ client D55070 may process application layer transport protocol packets such as ALC/LCT+, and collect and process a plurality of packets to create one or more ISO Base Media File Format (ISOBMFF) objects. The application layer transport protocol packets may include ALC/LCT packets, ALC/LCT+ packets, ROUTE packets, and/or MMTP packets.

The timing control D55080 may process a packet including system time information to control the system clock.

The signaling parser D55090 may acquire and parse DTV broadcast service related signaling, and generate and manage a channel map and the like based on the parsed signaling. In the present invention, the signaling parser may parse the extended MPD or MPD related information from the signaling information.

The DASH client D55100 may perform operations related to real-time streaming or adaptive streaming. The DASH client D55100 may receive DASH content from the HTTP server through the HTTP access client D55110. The DASH client D55100 may process the received DASH segment and output an ISO Base Media File Format object. In the present invention, the DASH client D55100 may deliver a Fully Qualified Representation ID or a segment URL to the ATSC 3.0 DTV control engine D55060. Here, the Fully Qualified Representation ID may refer to an ID that combines, for example, the MPD URL, period@id, and representation@id. The DASH client D55100 may also receive the MPD or MPD URL from the ATSC 3.0 DTV control engine D55060. The DASH client D55100 may receive a desired media stream or DASH segment from the HTTP server using the received MPD or MPD URL. In this specification, the DASH client D55100 may be referred to as a processor.

The HTTP access client D55110 may make a request for specific information to the HTTP server, and may receive and process a response from the HTTP server. Here, the HTTP server may process the request received from the HTTP access client and provide a response thereto.

The ISO BMFF parser D55120 may extract audio/video data from the ISO Base Media File Format object.

The media decoder D55130 may decode the received audio and/or video data and perform processing to present the decoded audio/video data.

The hybrid broadcast receiver of the present invention is required to extend or modify the MPD in order to provide the hybrid broadcast service through operative connection between the terrestrial broadcast network and the broadband. The terrestrial broadcast system may transmit the extended or modified MPD, and the hybrid broadcast receiver may receive the broadcast or broadband content using the extended or modified MPD. That is, the hybrid broadcast receiver may receive the extended or modified MPD through terrestrial broadcasting and receive content via terrestrial broadcasting or broadband based on MPD. The following describes elements and attributes that should be additionally included in the extended or modified MPD compared to the existing MPD. In the following description, the extended or modified MPD may be referred to as an MPD.

The MPD may be extended or modified to represent ATSC 3.0 services. An extended or modified MPD may additionally include MPD@anchorPresentationTime, Common@presentable, Common.Targeting, Common.TargetDevice and/or Common@associatedTo.

MPD@anchorPresentationTime may represent the presentation time anchor of segments included in the MPD, that is, a base time. Hereinafter, MPD@anchorPresentationTime may be used as an effective time of the MPD. MPD@anchorPresentationTime may represent the earliest playback point in time among the segments included in the MPD.

The MPD may further include common attributes and elements. The common attributes and elements may be applied to the AdaptionSet, Representation, SubRepresentation, and the like in the MPD. Common@presentable may indicate that the media described by MPD is a presentable component.

Common.Targeting may indicate the targeting properties and/or personalization properties of the media described by the MPD.

Common.TargetDevice may represent a target device or target devices of the media described by the MPD.

Common@associatedTo may represent an adaptationSet and/or representation associated with the media described by the MPD.

In addition, the MPD@id, Period@id, and AdaptationSet@id included in the MPD may be required to specify the media content described by the MPD. In other words, the DASH client may specify the content to be received as MPD@id, Period@id, and AdaptationSet@id based on the MPD and deliver the same to the ATSC 3.0 DTV control engine. The ATSC 3.0 DTV control engine may receive the content and deliver the same to the DASH client.

Figure 6:
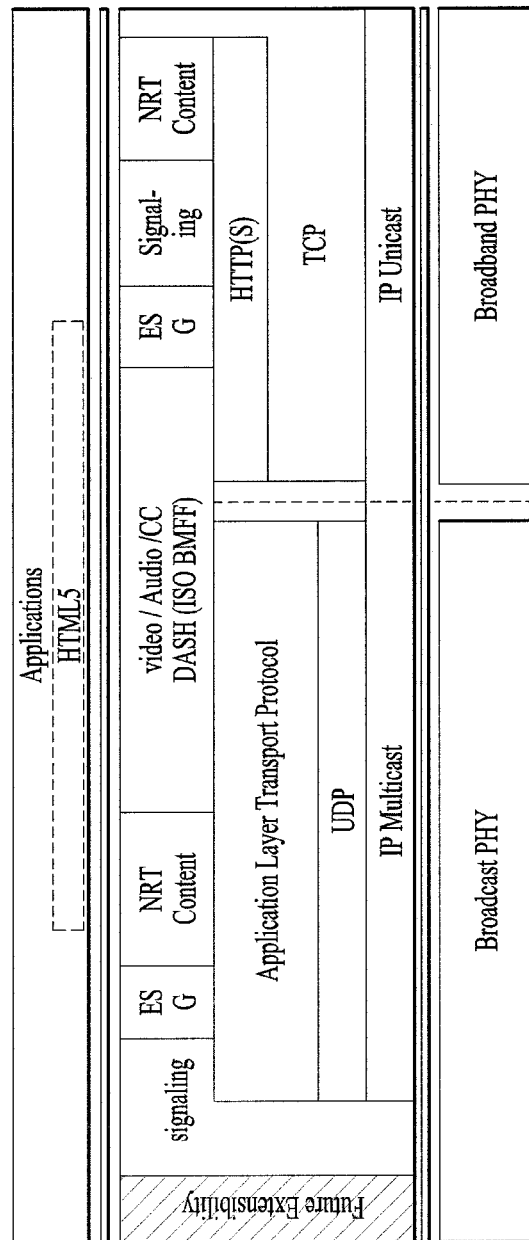
FIG. 6 shows a protocol stack of a next generation hybrid broadcast system according to an embodiment of the present invention.

FIG. 6 shows a protocol stack of a next generation hybrid broadcast system according to an embodiment of the present invention.

As shown in the figure, a next generation broadcast system supporting IP-based hybrid broadcasting may encapsulate audio or video data of a broadcast service in an ISO Base Media File Format (hereinafter referred to as ISO BMFF). Here, the encapsulation may be in the form of a DASH segment or an MPU (Media Processing Unit) of MMT. In addition, the next generation broadcast system may transmit encapsulated data over the broadcast network and the Internet network equally or differently according to the properties of each transmission network. The next generation broadcast system may also transmit the encapsulated data using at least one of broadcast or broadband. In case of broadcast network, the broadcast system may transmit data encapsulated in ISO Base Media File (ISO BMFF) through an application layer transport protocol packet supporting real time object transmission. For example, the broadcast system may encapsulate the data with Real-Time Object Delivery over Unidirectional Transport (ROUTE) or MMTP transport packet. Then, the broadcast system may generate an IP/UDP datagram from the encapsulated data, and transmit the same through a broadcast signal. When broadband is used, the broadcast system may transmit the encapsulated data to the receiving side based on a streaming technique such as DASH.

In addition, the broadcast system may transmit the signaling information of the broadcast service in the following manner. In the case of a broadcast network using broadcasting, the broadcast system may transmit signaling information through the physical layer of the next generation broadcast transmission system and the broadcast network according to the attribute of the signaling. Here, the broadcast system may transmit signaling information through a specific data pipe (DP) of a transport frame included in the broadcast signal. The broadcast signaling may be encapsulated in a bit stream or an IP/UDP datagram. When using broadband, the broadcast system may return signaling data in response to the request of the receiver.

In addition, the broadcast system may transmit the ESG or NRT content of the broadcast service in the following manner. In the case of a broadcast network, the broadcast system may encapsulate ESG or NRT content in an application layer transport protocol packet, for example, Real-Time Object Delivery over Unidirectional Transport (ROUTE), MMTP transport packet, or the like. Then, the broadcast system may generate an IP/UDP datagram from the encapsulated ESG or NRT content and transmit the same through a broadcast signal. When using broadband, the broadcast system may return the ESG or NRT content in response to the request of the receiver.

The broadcast system may transmit broadcast service related information through a separate channel, for example, a Quick Information Channel (FIC), in order to enable the receiver to quickly scan the broadcast service and content within the frequency.

The broadcast system may transmit information for scan and acquiring broadcast services in a transport frame. Herein, the area including the information for scan and acquisition of broadcast services may be referred to as FIC. The receiver may acquire information on the broadcast service generated and transmitted by one or more broadcast stations through the FIC, thereby making it possible to easily and quickly perform scan of the broadcast services available on the receiver.

In addition, a specific DP included in the transport frame may operate as a base DP for quickly and robustly transmitting signaling of a broadcast service and content transmitted in the corresponding transport frame. Link layer signaling or IP datagrams may be encapsulated in a specific type of generic packet and then transmitted through the DP. Here, the generic packet may include signaling data. Link (low) layer signaling may include signaling related to quick service scan/acquisition, context information of IP header compression, emergency alert, and the like.

FIG. 7 illustrates a method of transmitting signaling data in a next generation broadcast system according to an embodiment of the present invention. The signaling data of the next generation broadcast system may be transmitted as shown in the figure. In order to support quick service/content scan and acquisition by the receiver, the next generation broadcast transmission system may deliver signaling data for a broadcast service delivered by a corresponding physical layer frame through a Fast Information Channel (FIC). In the present specification, FIC may mean information on a service list. If there is no separate FIC, the signaling data may be transmitted through the path along which the link layer signaling is delivered. In other words, signaling information including a service and information on components (audio, video, etc.) in the service may be encapsulated and transmitted in IP/UDP datagrams through one or more DPs in the physical layer frame. According to an embodiment, the signaling information on a service and service components may be encapsulated and transmitted in an application layer transport packet (e.g., ROUTE packet or MMTP packet).

The upper part of FIG. 7 shows an embodiment in which the above-described signaling data is transmitted via FIC and one or more DPs. Signaling data for supporting rapid service scan/acquisition may be transmitted through FIC, and signaling data including detailed information about services and the like may be encapsulated in an IP datagram and transmitted through a specific DP. In the present specification, the signaling data including detailed information on services and the like may be referred to as service layer signaling.

The middle part of FIG. 7 shows an embodiment in which the above-described signaling data is transmitted through the FIC and one or more DPs. Signaling data for supporting rapid service scan/acquisition may be transmitted through FIC, and signaling data including detailed information about services and the like may be encapsulated in an IP datagram and transmitted through a specific DP. In addition, a portion of the signaling data, including information about a specific component included in the service may be transmitted through one or more transport sessions in the application layer transmission protocol. For example, a portion of the signaling data may be delivered over one or more transport sessions within a ROUTE session.

The lower part of FIG. 7 shows an embodiment in which the above-described signaling data is transmitted through the FIC and one or more DPs. Signaling data for supporting rapid service scan/acquisition may be transmitted through FIC, and signaling data containing detailed information about the service may be transmitted through one or more transport sessions in the ROUTE session.

FIG. 8 shows signaling data transmitted by a next generation broadcast system according to an embodiment of the present invention for rapid broadcast service scan of a receiver.

The present specification proposes signaling information used for a next generation broadcast reception device to scan and acquire a broadcast service.

In the next generation broadcast system, broadcast services and content generated by one or more broadcast stations within a specific frequency may be transmitted. The receiver may use the above-described signaling information to rapidly and easily scan broadcast stations existing within the frequency and the service/content of the corresponding broadcast stations. This may be represented by syntax as shown in the figure or may be represented in other formats such as XML.

Signaling information for rapid service scan and acquisition may be delivered over a rapid information channel (FIC), which is a separate channel in the physical layer transport frame. In addition, the signaling information may be transmitted through a common DP, which may transmit information that may be shared among the data pipes of the physical layer. Also, In addition, the signaling information may be transmitted through a path along which the signaling of the link layer is transmitted. The above-described signaling information may be encapsulated in an IP datagram and transmitted through a specific DP.

The signaling information may be transmitted through a service signaling channel through which service signaling is delivered, or a transport session of the application layer.

The signaling information (FIC information) for rapid service scan and acquisition may include at least one of the following fields. Herein, the FIC information may be referred to as service acquisition information. The FIC_protocol_version field may indicate the protocol version of the FIC signaling information (version of the structure of FIC). The TSID field may indicate an identifier of the overall broadcast stream.

The FIC_data_version field may indicate the data version of the FIC instance. The FIC_data_version field may be incremented if there is a change in the content of the FIC. The num_partitions field may represent the number of partitions in the broadcast stream. It is assumed that each broadcast stream can be transmitted in one or more partitions in order for the num_partitions field to be used. Each partition may contain a plurality of DPs by one broadcaster.

Each partition may represent a portion of the broadcast stream used by one broadcaster. The partition_protocol_version field may indicate the version of the partition structure described above. The base_DP_ID field may indicate an identifier for the base DP of the partition. The base DP may include a service signaling table. The service signaling table may include a list of all services in the partition.

That is, the service signaling table may list the services to be transmitted. Default properties for each service may also be defined. The base DP may be a robust DP within the partition and may contain other signaling tables for the partition. The base_DP_version field may indicate version information indicating a change in data transmitted through the base DP. For example, in transmitting service signaling or the like through the base DP, the base_DP_version field may be incremented by 1 when a change in service signaling occurs. The num_services field may indicate the number of at least one service belonging to the partition. The service_id field may indicate an identifier for the service. The channel_number field may indicate the channel number associated with the service. The service_category field may indicate a category of the corresponding service and may indicate, for example, A/V, audio, ESG, CoD, or the like. The short_service_name_length field may indicate the length of the name representing the service.

The short_Service_name field may indicate a name representing the service. The service_status field may indicate the status of the service and may indicate an active or suspended, hidden or shown attribute depending on the value thereof.

The service_distribution field may have attributes similar to the "multi-ensemble" flag of the ATSC M/H document. For example, the service_distribution field may indicate information about whether the service is included in the partition, whether the service is partially included in the partition but is presentable with the partition, whether another partition is required for presentation, or whether another broadcast stream is required for presentation.

The sp_indicator field is a service protection flag that may indicate whether one or more components needed for the presentation are protected.

FIG. 9 shows signaling data transmitted by a next generation broadcast system according to an embodiment of the present invention for rapid broadcast service scan of a receiver. FIC information (service acquisition information) to support rapid broadcast service scan and service/component acquisition may include information about an application layer transport session carrying service and component data. As shown in the figure, the FIC information may be expressed in binary format, but may be represented in other formats such as XML according to an embodiment. The FIC information may include the fields as shown in the figure. Description of fields which have been explained is omitted. The contents described with reference to FIG. 8 can be applied to the present description within a compatible range. The partition_id field may indicate the identifier of the partition.

The partition_protocol_version field may indicate the version of the partition structure described above.

The num_services field may indicate the number of at least one component belonging to the partition.

The service_id field may indicate an identifier for the service. The service_data_version field may indicate a change in service loop data in the FIC or a change in service signaling data associated with the service.

The service_data_version field may be incremented by 1 each time a change occurs in the included service data. The receiver may use the service_data_version field to detect a change in the service loop data of the FIC or a change in the signaling associated with the service.

The channel_number field may indicate the channel number associated with the service.

The service_category field may indicate a category of the corresponding service and may indicate, for example, A/V, audio, ESG, CoD, or the like. The short_service_name_length field may indicate the length of the name representing the service. The short_service_name field may indicate a name representing the service. The service_status field may indicate the status of the service and may indicate an active or suspended, hidden or shown attribute depending on the value thereof. The service_distribution field may have attributes similar to the "multi-ensemble" flag of the ATSC M/H document. The IP_version_flag field may indicate the format of the IP address that follows. If the value of the field is 0, it indicates that IPv4 format is used, and if 1, it indicates that IPv6 address format is used. The source_IP_address_flag field may indicate whether source_IP_addr is included. If the value of this field is 1, it indicates that source_IP_addr exists. The num_transport_session field may indicate the number of transport sessions (for example, ROUTE or MMTP sessions) for transmitting component data of the corresponding service in the broadcast stream. The source_IP_addr field may indicate the source IP address of the IP datagram including the component data of the corresponding service when the value of the source_IP_address_flag is 1. The dest_IP_addr field may indicate the destination IP address of the IP datagram including the component data of the corresponding service. The dest_UDP_port field may indicate the UDP port number of the UDP datagram that contains the component data of the corresponding service. The LSID_DP field may represent a data pipe identifier of the physical layer carrying signaling including detailed information about the transport session. Here, the signaling including the detailed information about the transport session may be, for example, an LCT session instance description including information on the detailed LCT transport session of each ROUTE session in the case of ROUTE.

The service_signaling_flag field may indicate whether the transport session transmits service signaling. When the value of service_signaling_flag is 1, it may indicate that the data transmitted through the corresponding transport session (for example, ROUTE or MMTP session) includes service signaling. The Transport session descriptors field may contain descriptors at the transport session level. Each descriptor is extensible, and each descriptor may include a num_descriptors field. Each descriptor may include as many descriptor loops as the value indicated by the num_descriptors field.

The transport session descriptors field may contain descriptors at the transport session level. The service descriptors field may include service level descriptors. The Partition descriptors field may include a partition level descriptor, and one partition may indicate a part of a broadcast stream used by one broadcaster or the like. The FIC session descriptors field may contain FIC level descriptors. According to an embodiment, each of the fields included in the FIC described above may be included in a table other than the FIC and transmitted together with a broadcast signal.

Figure 10:
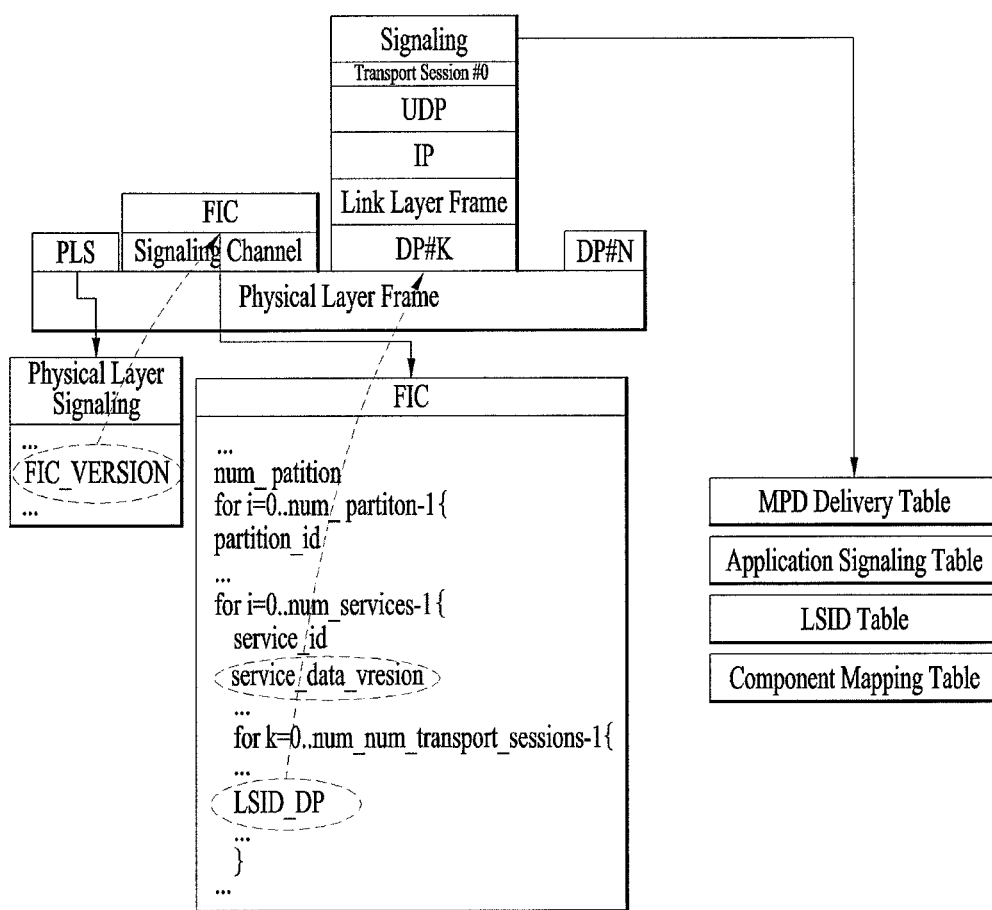
FIG. 10 illustrates a method of signaling a location of service layer signaling through FIC as signaling for rapid service scan and acquisition to acquire service layer signaling from the corresponding location according to an embodiment of the present invention.

FIG. 10 illustrates a method for transmitting FIC-based signaling according to an embodiment of the present invention.

The above-mentioned FIC-based signaling may be delivered as shown in the figure.

The FIC-based signaling may be referred to as service acquisition information or service acquisition signaling. As shown in the figure, the physical layer signaling may include a field for service acquisition information. The field for the service acquisition information may inform the receiver of whether the service acquisition information (FIC) is parsed. The receiver may parse the service acquisition information and check whether the data of the service signaling is changed through the service_data_version information. When the service signaling data is changed, the broadcast signal receiver may check the data pipe identifier of the physical layer that carries signaling including detailed information on the transport session, using the LSID_DP field. The broadcast receiver may verify the details of the transport session by parsing the DP indicated by the corresponding DP identifier. That is, the signaling method of the next generation broadcast system includes a procedure of signaling whether the physical layer signaling parses the service acquisition information, and the service acquisition information signals the location of the detailed information about the transport session to check the detailed information about the transport session. Here, the detailed information about the transport session may include an MPD transport table, an application signaling table, a transport session descriptor (LSID), and/or a component mapping table (CMT).

FIG. 11 shows signaling data transmitted by a next generation broadcast system according to an embodiment of the present invention for rapid broadcast service scan of a receiver. FIC information (service acquisition information) to support rapid broadcast service scan and service/component acquisition may include information about an application layer transport session carrying service and component data. As shown in the figure, the FIC information may be expressed in binary format, but may be represented in other formats such as XML according to an embodiment. The FIC information may include the fields as shown in the figure. Description of fields which have been explained is omitted. The contents described with reference to FIG. 8 or FIG. 9 can be applied to the present description within a compatible range.

The service_signaling_flag field may indicate whether the transport session transmits service signaling. If the value of the service_signaling_flag value is 1, it may indicate that there is a DP including service signaling. The signaling_data_version field may indicate a change in the associated service signaling data. Each time the service signaling data changes, the field may be incremented by 1. The receiver may use the signaling_data_version field to detect changes in the signaling associated with the service.

The signaling_DP field may indicate the data pipe identifier of the physical layer carrying the service signaling. The Transport session descriptors field may contain descriptors at the transport session level. Each descriptor is extensible, and each descriptor may include a num_descriptors field. Each descriptor may include as many descriptor loops as the value indicated by the num_descriptors field.

The Transport session descriptors field may contain descriptors at the transport session level. The service descriptors field may include service level descriptors. The Partition descriptors field may include a partition level descriptor, and one partition may indicate a part of a broadcast stream used by one broadcaster or the like. The FIC session descriptors field may contain FIC level descriptors. According to an embodiment, each of the fields included in the FIC described above may be included in a table other than the FIC and transmitted together with a broadcast signal.

Figure 12:
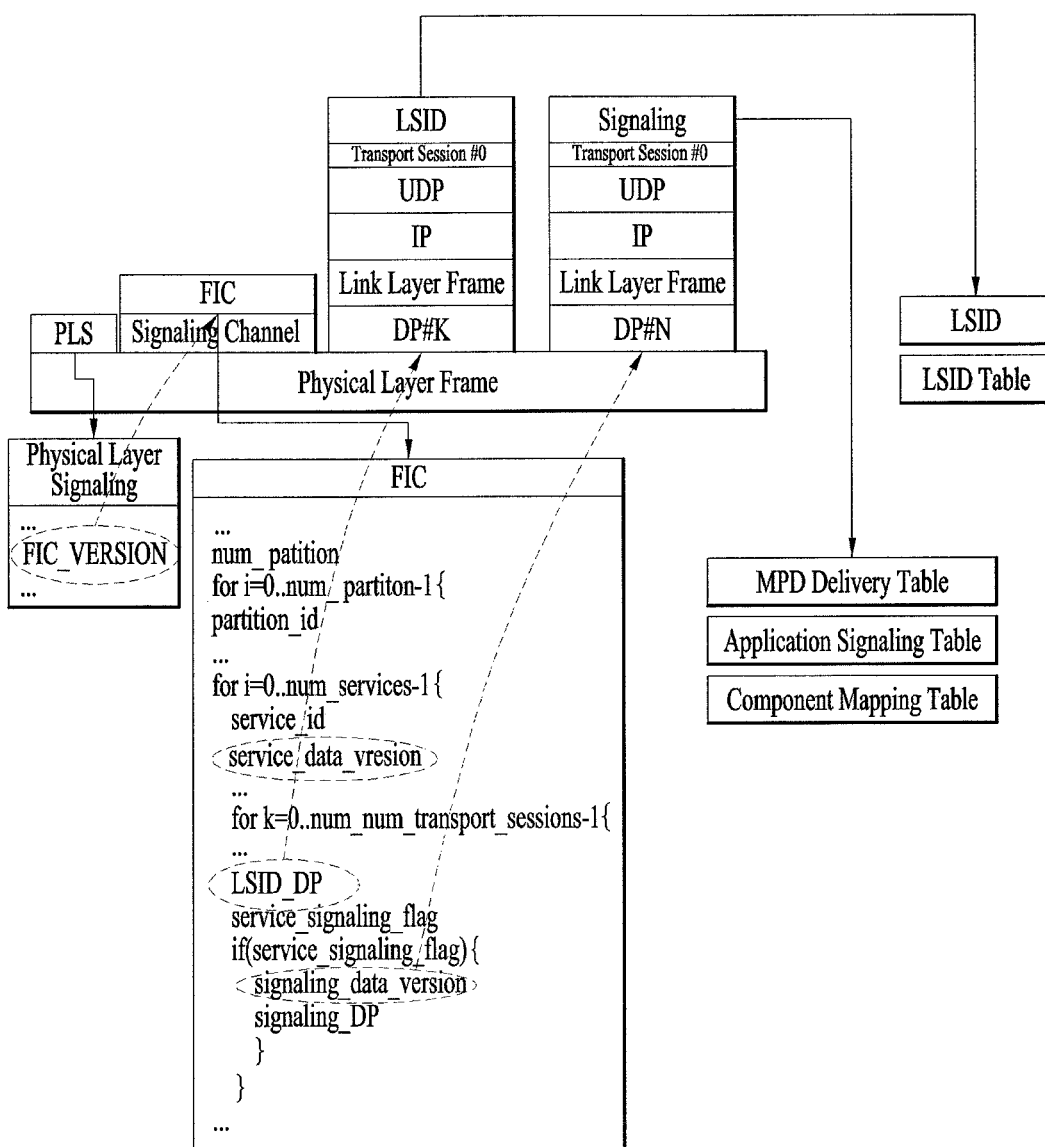
FIG. 12 illustrates a method of signaling a location of service layer signaling through FIC as signaling for rapid service scan and acquisition to acquire service layer signaling from the corresponding location according to another embodiment of the present invention.

FIG. 12 illustrates a method for transmitting FIC-based signaling according to another embodiment of the present invention. The above-mentioned FIC-based signaling may be delivered as shown in the figure.

The FIC-based signaling may be referred to as service acquisition information or service acquisition signaling. As shown in the figure, the physical layer signaling may include a field for service acquisition information. The field for the service acquisition information may inform the receiver of whether the service acquisition information (FIC) is parsed. The receiver parses the service acquisition information and may check whether the data of the service signaling is changed through the service_data_version information. When the service signaling data is changed, the broadcast signal receiver may acquire the LSID or LSID Table including detailed information on the transport session using the LSID_DP field through the DP identified from the LSID_DP field. In addition, the receiver may recognize change of the signaling data using information such as service_signaling_flag, signaling_data_version, signaling_DP, etc., and acquire the signaling data through the DP identified from the signaling_DP.

That is, the signaling method of the next generation broadcast system includes a procedure of signaling whether the physical layer signaling parses the service acquisition information, and the service acquisition information signals the location of the detailed information about the transport session to check the detailed information about the transport session. Here, the detailed information about the transport session may include an MPD transport table, an application signaling table, a transport session descriptor (LSID), and/or a component mapping table (CMT), and each detail of the transmission session may be delivered by different examples.

FIG. 13 shows a description of a transmission session instance of a next generation broadcast system according to an embodiment of the present invention. When the application layer transmission method is Real-Time Object Delivery over Unidirectional Transport (ROUTE), a ROUTE session may include one or more Layered Coding Transport (LCT) sessions. The details of one or more transport sessions may be signaled through a transport session instance description. The transport session instance descriptor may be referred to as LCT Session Instance Description (LSID) if it is ROUTE. In particular, the transport session instance description may define what is delivered by each LCT transport session constituting the ROUTE session. Each transport session may be uniquely identified by the Transport Session Identifier (TSI). The transport session identifier may be included in the LCT header. The transport session instance description may describe all transport sessions that are transmitted through the session. For example, the LSID may describe a mode LCT session carried by a ROUTE session. The transport session instance description may be delivered through the same ROUTE session as the transport sessions, or may be delivered through different ROUTE sessions or unicast.

When delivered in the same ROUTE session, the transport session instance description may be transmitted in the transport session with a specified transport session identifier (TSI) 0. Other objects referenced in the transport session instance description may also be delivered with TSI=0, but may have a TOI value different from the transport session instance description. Alternatively, it may be delivered in a separate session with TSI≠0. The transport session instance description may be updated using at least one of the version number, validity information, and expiration information. The transport session instance description may be represented in a bitstream or the like in addition to the illustrated format.

The transport session instance description may include a version attribute, a validFrom attribute, an expiration attribute, and may include TSI attributes and SourceFlow and RepairFlow information for each transport session. The version attribute may indicate the version information about the corresponding transport session instance description, and the version information may be incremented each time the content is updated. The transfer session instance description with the highest version number may indicate the most recent valid version. The validFrom attribute may indicate when the transfer session instance description begins to be valid. The validFrom attribute may not be included in the transport session instance description according to an embodiment. This indicates that the transport session instance description is valid immediately upon receiving the description. The expiration attribute may indicate when the transfer session instance description expires.

The expiration attribute may not be included in the transport session instance description according to the embodiment. This indicates that the transport session instance description is continuously valid. If a transport session instance description with an expiration attribute is received, expiration may conform to the expiration attribute. The TSI attribute may indicate a transport session identifier, and the SourceFlow element provides information about the source flow to be transmitted to the TSI, the details of which will be described below. The RepairFlow element may provide information about the repair flow sent to the corresponding TSI.

FIG. 14 shows a SourceFlow element of a next generation broadcast system according to an embodiment of the present invention.

The source flow element may include an EFDT element, an idRef attribute, a realtime attribute, a minBufferSize attribute, an Application Identifier element, and a Payload-Format element. The EFDT element may include detailed information of the file delivery data. An EFDT may indicate an extended File Delivery Table (FDT) instance, described in more detail below. The idRef attribute may indicate the identifier of the EFDT and may be represented as a URI by the corresponding transport session. The realtime attribute may indicate that the corresponding LCT packets include an extension header. The extension header may include a timestamp indicating the presentation time of the delivery object. The minBufferSize attribute may define the maximum amount of data needed to be stored in the receiver. The Application Identifier element may provide additional information that may be mapped to an application carried by that transport session. For example, the Representation ID of the DASH content or the Adaptation Set parameter of the DASH representation for selecting a transport session for rendering may be provided as additional information. The Payload-Format element may define the payload format of a ROUTE packet carrying an object of the source flow. The Payload-Format element may include a codePoint attribute, a deliveryObjectFormat attribute, a fragmentation attribute, a deliveryOrder attribute, a sourceFecPayloadID attribute, and/or a FECParameters element. The codePoint attribute may define the structure of the packet with the code point value used in the payload. This may indicate the value of the CP field in the LCT header.

The deliveryObjectFormat attribute may indicate the payload format of the delivery object. The fragmentation attribute may define fragmentation rules when an object to be transmitted is divided into one or more transport packets. The deliveryOrder attribute may indicate the order of transmission of the content of each transport packet carrying one transport object. The sourceFecPayloadID attribute may define the format of the source FEC payload identifier. The FECParameters element may define FEC parameters. This may include FEC encoding id and instance id.

FIG. 15 shows an EFDT of a next generation broadcast system according to an embodiment of the present invention.

The EFDT may include detailed information of the file delivery data. The EFDT may include an idRef attribute, a version attribute, a maxExpiresDelta attribute, a maxTransportSize attribute, and a FileTemplate element. The idRef attribute may indicate the identifier of the EFDT. The version attribute may indicate the version of the EFDT instance descriptor. This attribute may be incremented by 1 when EFDT is updated. It may indicate that the EFDT having the highest version number among the received EFDTs is the currently valid version. The maxExpiresDelta attribute may indicate the maximum expiry time of the object after the first packet associated with the object is sent.

The maxTransportSize attribute may indicate the maximum transmission size of the object described by the EFDT. For the FileTemplate element, the file URL or file template of the body part may be specified.

The transport session instance descriptor (LSID) element may be transmitted by the Transport Session Instance Descriptor Table (LSID Table) at the bottom of the figure. The LSID table may be transmitted by the above-described signaling message, which may be divided into a signaling message header and a signaling message data part. The signaling message data part may include a transport session instance descriptor (LSID) or a part thereof. The signaling message data may include a Transport Session Instance Descriptor (LSID) Table and may include the following fields. The Signaling_id field may indicate identifier information indicating that the signaling table includes a transport session instance descriptor (LSID). The protocol_version field may indicate a protocol version of the signaling, such as a signaling syntax that includes a transport session instance descriptor (LSID). The Signaling_version field may indicate a change in signaling data, including a transport session instance descriptor (LSID). In addition, the transport session instance descriptor table may further include the content of the LSID element described above.

Figure 16:
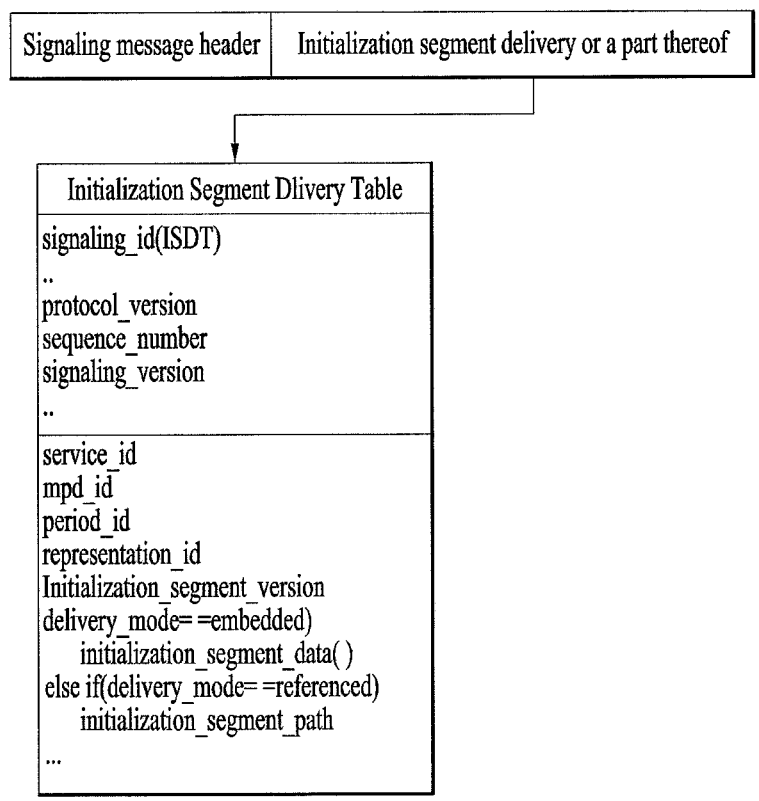
FIG. 16 shows a method for transmitting an ISDT used by a next generation broadcast system according to an embodiment of the present invention.

FIG. 16 shows a method for transmitting an ISDT used by a next generation broadcast system according to an embodiment of the present invention.

The next generation broadcast system may transmit signaling information for the initialization segment of the DASH Representation associated with the component in the broadcast service by transmitting the Initialization Segment Delivery Table (ISDT). A signaling message for the initialization segment of a DASH Representation associated with a component in a broadcast service may include a header and data. The signaling message header may conform to the above-described format, and the signaling message data may include initialization segment delivery information or a part thereof.

The initialization segment delivery information may include the following information.

The Signaling_id information may identify the initialization segment or a signaling message including path information. The protocol_version information may indicate the protocol version of the initialization segment delivery table, such as the syntax of the corresponding signaling message. The Sequence_number information may indicate the identifier for an instance of the initialization segment delivery table. The Signaling_version information may indicate a change in the signaling data of the initialization segment delivery table. The Service_id information may identify the service associated with the component.

The Mpd_id information may indicate an associated DASH MPD identifier associated with the component.

The period_id information may indicate an associated DASH Period identifier associated with the component. The representation_id information may indicate a DASH representation identifier associated with the component. The initialization_segment_version information may be version information indicating a change of the corresponding MPD or the like. The Delivery_mode information may indicate information about whether the initialization segment is included or is transmitted through another route. Initialization_segment_data( ) information may contain the initialization segment data itself. The initialization segment path information may include information on a path for acquiring an initialization segment, such as a URL for an initialization segment. Through the ISDT, the receiver may receive information about the Initialization segment of the DASH Representation associated with the component.

FIG. 17 shows a delivery structure of a signaling message of a next generation broadcast system according to an embodiment of the present invention.

The above signaling data may be communicated as shown in the figure if it is sent based on an application layer transport, for example, ROUTE. That is, a part signaling may be transmitted through a fast information channel in order to support rapid service scan. And a part of the signaling may be transmitted over a specific transport session and may also be delivered mixed with the component data.

The signaling information for supporting the rapid service scan and acquisition may be received on a channel separate from the transport session. Here, the separate channel may mean a separate data pipe (DP). Further, detailed information about the service may be received through a separately designated transport session. The transport session may have a value of TSI=0. The information delivered through the transport session designated herein may include an MPD delivery table, an application signaling table, a transport session instance description table, and/or a component mapping table. In addition, a part of signaling information may be delivered in the transport session along with the component data. For example, an initialization segment delivery table may be delivered with the component data.

The lower part of the figure shows an embodiment of acquiring a broadcast service in a next generation broadcast network. The receiver may tune the broadcast and acquire and parse information for rapid service scanning and acquisition when the service is selected. The location of the service layer signaling or transport session instance description (e.g., LSID) is then determined from the information for rapid service scan and acquisition to acquire and parse the description. In addition, the receiver may identify the transport session including the signaling, from which it may acquire and parse the signaling table, and determine a desired component. Through this process, the desired component may be presented. That is, the broadcast service may be provided to the user by acquiring information about the transport session from the information for rapid service scan and acquisition, checking the position of the desired component from the information about the transport session, and reproducing the component.

Hybrid broadcast can provide services through applications. Specifically, a broadcaster may provide broadcast content related information through applications. For example, the broadcaster may provide an application through which products used by actors in broadcast content can be purchased. For such an application, a broadcast transmission device 10 may transmit application signaling information for signaling an application. The application signaling information may include at least one of a trigger for triggering an application action and triggering application information for signaling information about a triggered application. This will be described with reference to the attached drawings.

The triggering application information may include additional information necessary to execute the application. Specifically, the triggering application information may include application properties. Further, the triggering application information may include information on a position at which a file included in the application can be downloaded and received. In addition, the triggering application information may include information on a position at which an NRT content item used by the application can be received.

Furthermore, the triggering application information may signal life-cycle variation of the application. Specifically, the lift-cycle of the application may include at least one of preparing, executing, terminating and suspending. For example, execution of the application may be prepared through the preparing state. In addition, the application may be executed in the preparing state. The application may enter the terminating state by terminating execution thereof. Further, execution of the application may be suspended in the suspending state.

The triggering application information may include an action to be executed by the application. Specifically, the triggering application information may include data necessary to execute an application action.

The triggering application information may include media time. Specifically, the triggering application information may include media time of content synchronized with the application.

Specifically, the broadcast transmission device 10 may transmit a trigger for triggering an application action. Further, a broadcast reception device 100 may cause the application to execute a specific action on the basis of the trigger. Specifically, the trigger may have the format below.

The trigger may include a domain part indicating a registered Internet domain name. In addition, the trigger may include a directory path part indicating a random character string for identifying a directory path of the domain name indicated by the domain part. Further, the trigger may include a parameter part indicating a parameter for triggering the application. Specifically, the trigger may have the following format.

<domain name part>/<directory path>[? <parameter>]

Here, the domain name part and the directory path part may be mandatory parts essentially included in the trigger. In addition, the parameter part is an optional part optionally included in the trigger. The parameter part may include at least one of an event ID for identifying an event, an application ID for identifying a target application of the trigger, and a timing value indicating a time when an event is performed. Furthermore, the parameter part may include content media time. Moreover, the parameter part may include a content ID for identifying content reproduced by the broadcast reception device 100. In addition, the parameter part may include spread information for spreading triggering application information request traffic of the broadcast reception device 100. Further, the parameter set may include version information indicating a version of triggering application information related to the trigger.

Specifically, the parameter part may include at least one of the following strings.

<media time>
    <media time> and <spread>
    <media time> and <version>
    <media time> and <version> and <spread>
    <event time>
    <event time> and <spread>
    <event time> and <version>
    <event time> and <version> and <spread>

<event time> may include an event ID for identifying an event. Here, the event may refer to execution of an action by the application according to the trigger. Here, the event ID may be designated by "e=". In addition, the event ID may include two or three decimals following "e=". Here, the decimals may be discriminated using a period ("."). Further, <event time> may include an application ID for identifying the application that is a target of the trigger. Here, the application may be called a triggered declarative object (TDO). The application ID may be matched to an application ID of the triggering application information. Accordingly, the broadcast reception device 100 may acquire information about the application that is a target of the trigger from the triggering application information on the basis of the application ID of the trigger. Here, the triggering application information may be a TDO parameter table (TPT) for signaling trigger information. In addition, the parameter part may include a data ID for identifying a data element used for the event. Further, the parameter part may include a timing value indicating a time when the event is performed. Here, the timing value may be designated by "t=". In a specific embodiment, the timing value may be designated as a hexadecimal represented by one to eight characters following "t=". When <event time> does not include the timing value, the trigger may trigger the application to execute the event at the trigger reception time.

<media time> may include media time of content. Specifically, <media time> may indicate a media time stamp of content synchronized with the application triggered by the trigger. Specifically, the media time may be designated by "m=". The media time may be designated as a hexadecimal represented by one to eight characters following "m=". Further, <media time> may be denoted in milliseconds. In addition, <media time> may indicate a content ID for identifying content currently reproduced by the broadcast reception device 100. The content ID may be designated by "c=". Specifically, when an application is executed according to a direct execution model, <media time> may include the content ID. In a specific embodiment, the broadcast reception device 100 may receive a time base trigger delivering reference time for application synchronization and extract the content ID from the time base trigger. Here, the broadcast reception device 100 may receive an interactive service for content currently reproduced thereby by transmitting the content ID to a server for the interactive service.

<version> may include version information indicating a version of the triggering application information related to the trigger. Here, the triggering application information may be a TPT. Specifically, the version information may be designated by "v=". Further, the version information may be designated by a decimal represented by one to three characters following "v=". The broadcast reception device 100 may extract the version information from the trigger and acquire the triggering application information on the basis of the version information.

<spread> may include spread information that is a criterion for calculation of a time for which the broadcast reception device 100 needs to wait to request that a server providing the application signaling information provide the triggering application information. Specifically, the broadcast reception device 100 may calculate a random value on the basis of the time indicated by the spread information, wait for the random value and then request the triggering application information. The spread information may be designated by "s=". Specifically, the spread information may be designated by a decimal represented by one to three characters following "s=". The broadcast reception device 100 can request the triggering application information through the spread information to prevent traffic of the server providing the triggering application information from being concentrated on the trigger reception time.

<others> may include information other than the aforementioned parameters. The broadcast reception device 100 may ignore parameters that are not recognizable.

A trigger including a media time of content may be called a time base trigger. Specifically, the time base trigger may deliver a media time stamp of content reproduced by the broadcast reception device 100. In addition, the broadcast reception device 100 may generate a reference time for synchronization between an application action and content on the basis of the time base trigger.

A trigger including an event time may be called an activation trigger because the activation trigger designates a time when the corresponding event is performed. The broadcast reception device 100 may perform a triggered operation on the basis of the event time of the trigger. Specifically, the broadcast reception device 100 may extract the event time from the trigger and perform an operation triggered at the event time.

In addition, the parameter part of the trigger may include not only a timing value indicating a time when an event starts to be performed but also a timing value indicating a time when the event is ended. Further, when the broadcast reception device 100 receives the trigger after an event start time and before an event end time, the broadcast reception device 100 may perform the event triggered by the trigger. Specifically, the parameter part may include <event start time> and <event end time>.

<event start time> may include a timing value indicating a time when an event starts to be performed. The timing value may be designated by "st=" following "e=" identifying the event.

<event end time> may include a timing value indicating a time when the event is ended. The timing value may be designated by "et=" following "e=" identifying the event.

FIG. 18 shows a syntax according to the above-described trigger syntax.

In another specific embodiment, the trigger syntax may have a timed text format displayed at a specific time. Specifically, timed text may be closed captioning.

FIG. 19 shows a syntax of application signaling information according to an embodiment of the present invention.

As described above, the triggering application information may be called a TPT. The triggering application information may signal applications corresponding to all program segments or partial program segments according to time. Here, a program segment indicates a time interval included in a program.

The triggering application information may include protocol version information indicating the protocol version of the triggering application information. Specifically, the triggering application information may include major protocol version information indicating major version information of a protocol and minor protocol version information indicating additional version information of the protocol. Here, the major protocol version information may be a 3-bit integer. The broadcast reception device 100 may discard the triggering application information when the broadcast reception device 100 cannot support at least one of the major protocol version information and the minor protocol version information. The major protocol version information may be referred to as MajorProtocolVersion. The minor protocol version information may be referred to as MinorProtocolVersion. In a specific embodiment, the major protocol version information may be a 3-bit element. The minor protocol version information may be a 4-bit element.

The triggering application information may include an ID for identifying the triggering application information. Specifically, the triggering application information may be an ID identifying a program segment. In a specific embodiment, an ID identifying a program segment may be generated by combining a domain name and a program ID. For example, the ID may be domain_name/program_id.

The triggering application information may include version information for indicating triggering application information update history. The value of the version information may be changed whenever the triggering application information is changed. The broadcast reception device 100 may determine whether to extract detailed information included in the triggering application information on the basis of the version information. In a specific embodiment, the version information may be referred to as tptVersion. In a specific embodiment, the version information may be an 8-bit element.

The triggering application information may include expiration information indicating an expiration date and time of the triggering application information. Specifically, the broadcast reception device 100 may store the triggering application information and reuse the triggering application information until the expiration date and time indicated by the expiration information. In a specific embodiment, the expiration information may be referred to as expirationDate. In a specific embodiment, the expiration information may be a 16-bit element.

The triggering application information may include a service ID identifying a service including an application. In a specific embodiment, the service ID may indicate an ID of a non-real-time (NRT) service defined in ATSC standards. In a specific embodiment, the service ID may be referred to as servcieId. In a specific embodiment, the service ID may be a 16-bit integer.

The triggering application information may include a base URL indicating a base address of a URL included in application information. In a specific embodiment, the base URL may be referred to as baseURL.

The triggering application information may include capability information indicating mandatory capabilities necessary for presentation of an application signaled by application information. The capability information may conform to definition of capabilities descriptor defined by ATSC standards. In a specific embodiment, the capability information may be referred to as Capabilities.

The triggering application information may include live trigger information that is generated in real time and transmitted through the Internet along with transmission of content. Specifically, the live trigger information may include a URL of a server that transmits a live trigger. In addition, the live trigger information may include a polling period when the live trigger is transmitted according to polling. In a specific embodiment, the live trigger information may be referred to as LiveTrigger. Further, the URL of the server that transmits the live trigger may be referred to as URL. The polling period may be referred to as pollPeriod.

The triggering application information may include information about an application. Application information may include detailed information of an application as a lower element. In a specific embodiment, the application information may be referred to as TDO.

The application information may include an application ID identifying an application. In a specific embodiment, the application ID may be referred to as appID. Further, the application ID may be a 16-bit element.

The application information may include application type information indicating an application type. In a specific embodiment, when the application type information is "1", the application type information is TDO. In a specific embodiment, the application type information may be referred to as appType. In a specific embodiment, the application type information may be a 16-bit element.

The application information may include application name information indicating an application name. In a specific embodiment, the application name information may be referred to as appName.

The application information may include a global ID that globally uniquely identifies an application. The global ID may be used to indicate the same application not only in the corresponding triggering application information but also in other application information. In a specific embodiment, the global ID may be referred to as globalID.

The application information may include application version information corresponding to version information indicating application update history. In a specific embodiment, the application version information may be referred to as appVersion. In a specific embodiment, appVersion may be an 8-bit element.

The application information may include cookie space information indicating the size of a persistent storage space necessary for the broadcast reception device 100 to execute an application. The cookie space information may represent the size of a storage space necessary to execute an application in kilobytes. In a specific embodiment, the cookie space information may be referred to as cookieSpace. In a specific embodiment, the cookie space information may be an 8-bit element.

The application information may include use frequency information indicating the frequency of use of an application. The use frequency information may indicate at least one of "only once", "every hour", "every day", "every week" and "every month". In a specific embodiment, the use frequency information may have a value in the range of 1 to 16. In a specific embodiment, the use frequency information may be referred to as frequencyOfUse.

The application information may include expiration information indicating an expiration time and date of an application. In a specific embodiment, the expiration information may be referred to as expireDate.

The application information may include test application information indicating an application for test broadcast. The broadcast reception device 100 may ignore the application for test broadcast on the basis of the test application information. In a specific embodiment, the test application information may be referred to as testTDO. In a specific embodiment, the test application information may be a Boolean element.

The application information may include Internet availability information indicating that an application can be received through the Internet. In a specific embodiment, the Internet availability information may be referred to as availableInternet. In a specific embodiment, the Internet availability information may be a Boolean element.

The application information may include broadcast availability information indicating that an application can be received through a broadcast network. In a specific embodiment, the broadcast availability information may be referred to as availableBroadcast. In a specific embodiment, the broadcast availability information may be a Boolean element.

The application information may include URL information identifying a file corresponding to part of an application. In a specific embodiment, the application information may be referred to as URL.

The URL information may include entry information indicating whether the corresponding file is an entry file. Specifically, the entry file refers to a file that needs to be executed first for execution of the corresponding application.

The application information may include application boundary information indicating the boundary of an application. In a specific embodiment, the application boundary information may be referred to as ApplicationBoundary.

Furthermore, the application boundary information may include origin URL information necessary to add an application boundary. The origin URL information may be referred to as originURL.

The application information may include content item information indicating information about a content item used by an application. The content item information may include detailed information about the content item. In a specific embodiment, the content item information may be referred to as contentItem.

The content item may include URL information identifying a file corresponding to part of the corresponding content item. The URL information may be referred to as URL.

The URL information may include entry information indicating whether the corresponding file is an entry content file. Specifically, an entry file refers to a file that needs to be executed first for execution of the corresponding content item. In a specific embodiment, the entry information may be referred to as entry.

The content item information may include update information indicating whether the corresponding content item can be updated. Specifically, the update information indicates whether the content item includes a fixed file or is a real-time data feed. In a specific embodiment, the update information may be referred to as updateAvail. The update information may be a Boolean element.

The content item information may include a polling period when whether a file included in the content item is updated through a polling method is checked when the content item can be updated. Specifically, the broadcast reception device 100 may check whether the content item is updated on the basis of the polling period. Further, the polling period may be referred to as pollPeriod.

The content item information may include size information indicating the size of the content item. In a specific embodiment, the size information may indicate a content item size in kilobytes. The size information may be referred to as size.

The content item information may include Internet availability information indicating that the content item can be received through the Internet. In a specific embodiment, the Internet availability information may be referred to as availableInternet. In a specific embodiment, the Internet availability information may be a Boolean element.

The content item information may include broadcast availability information indicating that the content item can be received through a broadcast network. In a specific embodiment, the broadcast availability information may be referred to as availableBroadcast. In a specific embodiment, the broadcast availability information may be a Boolean element.

The application information may include event information indicating information about an event of the application. In a specific embodiment, the event information may be referred to as Event.

The event information may include an event ID identifying the event. Specifically, the event ID can uniquely identify the event in the corresponding application range. In a specific embodiment, the event ID may be referred to as eventID. In a specific embodiment, the event ID may be a 16-bit element.

The event information may include destination information indicating a target device of the application. The destination information may indicate that the application is only for a primary device that receives broadcast signals. The destination information may indicate that the application is only for one or more companion devices associated with the primary device. The destination information may indicate that the application is for both the primary device and companion devices. In a specific embodiment, the destination information may be referred to as destination.

The event information may include diffusion information for diffusing a triggering application information request. Specifically, the broadcast reception device 100 may calculate a random value on the basis of the diffusion information, wait for the random value and then request the server to provide triggering application information. Specifically, the broadcast reception device 100 may wait for a time corresponding to multiplication of the random value by 10 ms and then request the server to provide the triggering application information. In a specific embodiment, the diffusion information may be referred to as diffusion. In a specific embodiment, the diffusion information may be an 8-bit element.

The event information may include data information indicating data associated with the event. Each event may have a data element associated therewith. In a specific embodiment, the data information may be referred to as Data.

The data information may include a data ID identifying data. The data ID may be referred to as dataID. The data ID may be a 16-bit element.

In hybrid broadcast, media content can be transmitted using the MPEG-DASH protocol and the MMT protocol, as described above. When such media content is transmitted, it is necessary to transmit a trigger for triggering an application associated with the media content. Accordingly, a method of transmitting a trigger using the MPEG-DASH protocol and the MMT protocol is required. This will be described below with reference to the attached drawings.

MPEG-DASH defines an event in order to deliver non-period information to a DASH client or an application. Further, MPEG-DASH defines an associated event sequence as an event stream. Specifically, an MPEG-DASH event may be used for delivery of timed information. Here, information included in the MPEG-DASH event may be an event message. The MPEG-DASH event may be delivered through an MPD. Further, the MPEG-DASH event may be delivered through in-band of representation. The broadcast transmission device 10 may transmit a trigger for triggering an application as an MPEG-DASH event.

Delivery of an MPEG-DASH event through an MPD will be described with reference to FIGS. 20 and 21.

FIG. 20 shows a syntax of an event stream element included in the MPD according to an embodiment of the present invention. FIG. 21 shows a syntax of an event element of the event stream element included in the MPD according to an embodiment of the present invention.

A presentation time of an event sequence of MPEG-DASH may be provided at a period level. Specifically, the period element of the MPD may include an event stream element indicating information about an event stream. The broadcast reception device 100 may finish an event when an end time of a period including the event expires. Particularly, the broadcast reception device 100 may finish the event when the end time of the period including the event expires even when the event starts at a period boundary time.

A period element may include an event stream element containing information about an event stream. In a specific embodiment, the event stream element may be referred to as Event Stream.

The event stream element may include a scheme ID element identifying a scheme of a message included in an event. In a specific embodiment, the scheme ID element may be referred to as schemeIDUri.

The event stream element may include a value element indicating a value for an event stream. In a specific embodiment, a value attribute may be referred to as value.

The event stream element may include a time scale attribute indicating a time scale when an event included in an event stream is a timed event. In a specific embodiment, the time scale attribute may be referred to as timescale.

The event stream element may include an event element specifying each event and containing a message corresponding to the contents of the corresponding event. In a specific embodiment, the event element may be referred to as event.

The event element may include a presentation start time attribute indicating a presentation start time of an event. Specifically, the presentation start time attribute may indicate a relative presentation start time on the basis of a period start time. When the presentation start time attribute is not present, the presentation start time may have a value of 0. In a specific embodiment, the presentation start time attribute may be referred to as presentationTime.

The event element may include a presentation duration attribute indicating an event presentation duration. When the presentation duration attribute is not present, a presentation duration value may be unknown. In a specific embodiment, the presentation duration attribute may be referred to as duration.

The event element may include an ID attribute for identifying an event. Events which are related to the same content and have the same event element attribute value have the same ID element value.

Delivery of an MPEG-DASH event through an in-band stream will be described with reference to FIG. 22.

FIG. 22 shows a syntax of an event message box for in-band event signaling according to an embodiment of the present invention.

The broadcast transmission device 10 may multiplex an event stream of MPEG-DASH with a representation. Specifically, the broadcast transmission device 10 may multiplex the event stream of MPEG-DASH as part of segments with a representation.

The event stream of MPEG-DASH may be inserted into a selected representation. In a specific embodiment, the broadcast transmission device 10 may insert the event stream into some representations included in an adaptation set. In another specific embodiment, the broadcast transmission device 10 may insert the event stream into all representations included in the adaptation set.

An in-band event stream included in a representation may be represented by an in-band event stream element included in the adaption set or a representation level. In a specific embodiment, the in-band event stream element may be referred to as InbandEventStream. In a specific embodiment, one representation may include a plurality of in-band event streams. Each in-band event stream may be represented by an additional in-band event stream element.

The event message box "emsg" may provide signaling with respect to a normal event related to a media presentation time. Further, the event message box may signal a specific action related to DASH operation. When a media segment is encapsulated in ISO BMFF, the media segment may include one or more event message boxes. Further, the event message box may be positioned before a moof box. "moof".

The scheme of the event message box may be defined in the MPD. Further, the broadcast reception device 100 may ignore an event message box having a scheme that is not defined in the MPD.

The event message box may include a scheme ID field for identifying the scheme of the event message box. In a specific embodiment, the scheme ID field may be referred to as scheme_id_uri.

The event message box may include a value field indicating a value of an event. The value of the value field may have a scheme and meaning depending on the scheme identified by the scheme ID field. In a specific embodiment, the value field may be referred to as value.

The event message box may include a time scale field indicating a time scale related to the event message box. Specifically, the time scale field may indicate time scales of a presentation start time delay field and a presentation duration field included in the event message box. In a specific embodiment, the time scale field may be referred to as timescale.

The event message box may include the presentation start time delay field that indicates a delay of an event presentation start time from the earliest presentation time. Specifically, the broadcast reception device 10 may extract the earliest presentation time of a segment from a segment index box "sidx". Here, the broadcast reception device 100 can acquire an event presentation start time by adding a time when the presentation start time delay field appears to a segment presentation time. In a specific embodiment, the presentation start time delay field may be referred to as presentation_time_delta.

The event message box may include an event presentation duration field indicating an event presentation duration. When the event presentation duration field has a value of 0xffff, this indicates that the event presentation duration is unknown. In a specific embodiment, the event presentation duration field may be referred to as event_duration.

The event message box may include a message data field indicating a body of the message box. The message data field may have data depending on the scheme of the message box.

Application signaling information can be transmitted by matching trigger properties to an MPD element indicating an event stream of MPEG-DASH and an event message box indicating an in-band event stream. This will be described with reference to FIGS. 23 to 28.

First of all, an MPEG-DASH event and an event described in the triggering application information are explained to clearly discriminate the terms. The MPEG-DASH event is additional information related to a media time occasionally transmitted to a DASH client and an application. The event described in the triggering application information indicates an event triggered by a trigger. Specifically, an event triggered by a trigger may represent execution of a specific action by an application. Further, an event triggered by a trigger may represent a state variation of an application. To discriminate an MPEG-DASH event from an event triggered by a trigger, the event triggered by the trigger is called a triggering event. Specifically, the triggering event can indicate an event generated by a trigger.

FIG. 23 shows a matching relationship between a trigger property for signaling the position of information about an application triggered according to an embodiment of the present invention and MPD elements and an event message box.

The broadcast transmission device 10 may transmit the position of triggering application information as an MPEG-DASH event. Here, the ID attribute included in the event element of the MPD may indicate the ID identifying the triggering application information. Further, the message of the event may represent the position of the triggering application information. The broadcast reception device 100 may receive the triggering application information on the basis of the event element. Specifically, the broadcast reception device 100 may receive the triggering application information by extracting the position of the triggering application information from the message of the event.

In another specific embodiment, the ID field included in the event message box may indicate the ID identifying the triggering application information. Further, the message data field included in the event message box may indicate the position of the triggering application information. The broadcast reception device 100 may receive the triggering application information on the basis of the event message box. Specifically, the broadcast reception device 100 may receive the triggering application information by extracting the position of the triggering application information from the message data field of the event message box.

As described above, the triggering application information may be TPT.

FIG. 24 shows a matching relationship between a trigger property for signaling an application status and MPD elements and an event message box according to an embodiment of the present invention.

The broadcast transmission device 10 may transmit an application status as an MPEG-DASH event. Here, the presentation start time element included in the event element of the MPD may indicate a start time of a triggering event. Further, the ID attribute included in the event element of the MPD may represent the ID identifying the triggering application information. In addition, the message included in the event element may represent the application status. The broadcast reception device 100 may change the application status on the basis of the event element. Specifically, the broadcast reception device 100 can change the application status by extracting the application status from the message included in the event element. Specifically, the broadcast reception device 100 can change the application status at a triggering event start time by extracting the application status from the message included in the event element and extracting the event start time from the presentation start time element.

In another specific embodiment, the presentation start delay time field included in the event message box may indicate a triggering event start time. Further, the ID field included in the event message box may represent the ID identifying the triggering application information. In addition, the message data field included in the event message box may represent the application status. The broadcast reception device 100 may change the application status on the basis of the event message box. Specifically, the broadcast reception device 100 can change the application status by extracting the application status from the message data field of the event message box. In a specific embodiment, the broadcast reception device 100 can change the application status at a triggering event start time by extracting the application status from the message data field of the event message box and extracting the triggering event start time from the presentation start time delay field.

The application status may represent at least one of preparing, execution, termination and suspending.

As described above, the triggering application information may be TPT.

FIG. 25 shows a matching relationship between a trigger property for signaling application actions and MPD elements and an event message box according to an embodiment of the present invention.

The broadcast transmission device 10 may transmit an application action as an MPEG-DASH event. Here, the presentation start time element included in the event element of the MPD may indicate a triggering event start time. Further, the presentation duration element included in the event element of the MPD may represent a difference between the triggering event start time and a triggering event end time. In another specific embodiment, the presentation duration element included in the event element of the MPD may indicate the triggering event end time. Further, the ID attribute included in the event element of the MPD may indicate the ID identifying the triggering application information. In addition, the message included in the event element may represent an action carried out by an application. Specifically, the message included in the event element may include at least one of an application ID for identifying a triggered application, an event ID for identifying a triggering event and a data ID for identifying data. Specifically, the message included in the event element may be the aforementioned trigger type. Here, the message included in the event element may not include the triggering event start time, triggering event end time and an ID identifying a program segment, included in the aforementioned attribute. For example, the message included in the event element may be xbc.tv/e12?e=7.5. The broadcast reception device 100 may perform an application action on the basis of the event element. Specifically, the broadcast reception device 100 may perform the application action by extracting the application action from the message included in the event element. Specifically, the broadcast reception device 100 may perform the application action at a triggering event start time by extracting the application action from the message included in the event element and extracting the triggering event start time from the presentation start time element. In a specific embodiment, the broadcast reception device 100 may perform the application action after the triggering event start time and before a triggering event end time by extracting the application action from the message included in the event element and extracting the triggering event start time from the presentation start time element. The broadcast reception device 100 may ignore an MPEG-DASH event message when the MPEG-DASH event message is received after the triggering event end time.

In another specific embodiment, the presentation start delay time field included in the event message box may indicate a triggering event start time. Further, the presentation duration field included in the event message box of the MPD may represent a difference between the triggering event start time and a triggering event end time. In another specific embodiment, the presentation duration field included in the event message box of the MPD may indicate the triggering event end time. Further, the ID field included in the event message box may indicate the ID identifying the triggering application information. In addition, the message data field included in the event message box may represent an action carried by an application. Specifically, the message data field included in the event message box may include at least one of an application ID for identifying a triggered application, an event ID for identifying a triggering event and a data ID for identifying data. Specifically, the message data field included in the event message box may be the aforementioned trigger type. Here, the message data field included in the event message box may not include the triggering event start time, triggering event end time and an ID identifying a program segment, included in the aforementioned attribute. For example, the message data field included in the event message box may be xbc.tv/e12?e=7.5. The broadcast reception device 100 may perform an application action on the basis of the event message box. Specifically, the broadcast reception device 100 may perform the application action by extracting the application action from the message data field of the event message box. Specifically, the broadcast reception device 100 may perform the application action at a triggering event start time by extracting the application action from the message data field of the event message box and extracting the triggering event start time from the presentation start time delay field. In a specific embodiment, the broadcast reception device 100 may perform the application action after the triggering event start time and before a triggering event end time by extracting the application action from the message data field of the event message box and extracting the triggering event start time from the presentation start time delay field. The broadcast reception device 100 may ignore the event message box when the event message box is received after the triggering event end time.

FIG. 26 shows a matching relationship between a trigger property for signaling a media time and MPD elements and an event message box according to an embodiment of the present invention.

The broadcast transmission device 10 may transmit a media time of content as an MPEG-DASH event. Here, the presentation start time element included in the event element of the MPD may indicate the media time of the content. Here, the content may be content presented by the broadcast reception device 100. In addition, the ID attribute included in the event element of the MPD may represent the ID identifying the triggering application information. The broadcast reception device 100 may extract the media time of the content on the basis of the event element. Further, the broadcast reception device 100 may generate a time line corresponding to a basis of synchronization between a triggering event and the content on the basis of the media time of the content. Specifically, the broadcast reception device 100 may generate the time line corresponding to a basis of synchronization between the triggering event and the content by extracting the media time of the content from the presentation start time element included in the event element.

Furthermore, the presentation start time delay field included in the event message box of the MPD may indicate a media time of content. Here, the content may be content presented by the broadcast reception device 100. In addition, the ID attribute included in the event element of the MPD may represent the ID identifying the triggering application information.

The broadcast reception device 100 may extract the media time of the content on the basis of the event message box. Further, the broadcast reception device 100 may generate a time line corresponding to a basis of synchronization between a triggering event and the content on the basis of the media time of the content. Here, the content may be content presented by the broadcast reception device 100. Specifically, the broadcast reception device 100 may generate the time line corresponding to a basis of synchronization between the triggering event and the content by extracting the media time of the content from the presentation start time delay field included in the event message box.

Accordingly, the broadcast reception device 100 can synchronize the content with the triggering event without extracting media time information included in the content.

FIG. 27 shows definition of a value attribute for signaling all trigger properties as one event according to an embodiment of the present invention.

To transmit a trigger as an MPEG-DASH event, the event element may indicate the type of information signaled by the trigger. Specifically, the value attribute included in the event stream element may represent that a trigger included in the event message signals the position of triggering application information. Here, the value of the value attribute may be tpt. Further, the value attribute included in the event stream element may represent that a trigger included in the event message signals an application status. Here, the value of the value attribute may be "status". In addition, the value attribute included in the event stream element may represent that a trigger included in the event message signals an application action. Here, the value of the value attribute may be "action". The value attribute included in the event stream element may represent that a trigger included in the event message signals a media time of content. Here, the value of the value attribute may be "mediatime". Further, the value attribute included in the event stream element may represent that a trigger included in the event message includes all information that can be included therein. Here, the value of the value attribute may be "trigger".

In another specific embodiment, the value field included in the event message box may represent that a trigger included in the data message field of the event message box signals the position of triggering application information. Here, the value of the value field may be tpt. Further, the value field included in the event message box may represent that a trigger included in the data message field of the event message box signals an application status. Here, the value of the value field may be "status". In addition, the value field included in the event message box may represent that a trigger included in the data message field of the event message box signals an application action. Here, the value of the value field may be "action". The value field included in the event message box may represent that a trigger included in the data message field of the event message box signals a media time of content. Here, the value of the value field may be "mediatime". Further, the value field included in the event message box may represent that a trigger included in the data message field of the event message box includes all information that can be included therein. Here, the value of the value field may be "trigger". This will be described in detail below with reference to the attached drawings.

Figures 28, 29:
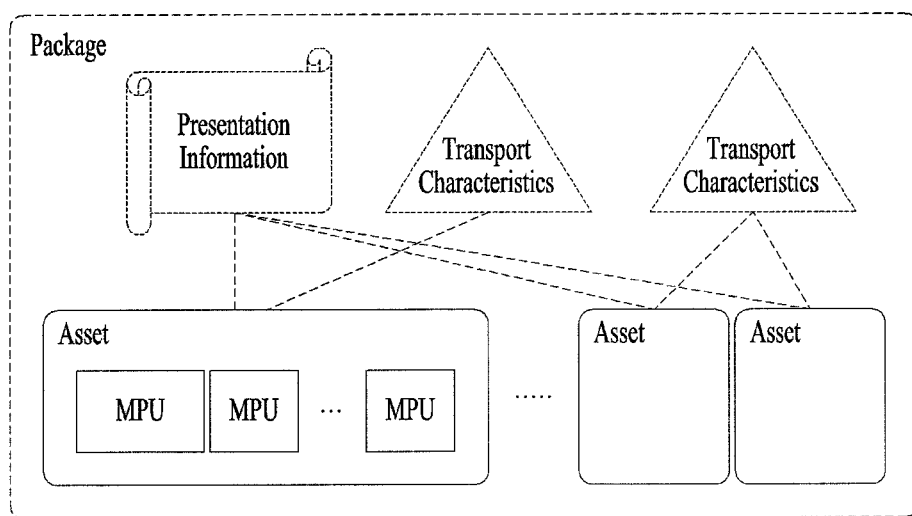
FIG. 28 shows a matching relationship between an identifier attribute and a message attribute of an event element for signaling all trigger properties as one event and an identifier field and a message data field of the event message box according to an embodiment of the present invention.
FIG. 29 shows a structure of a package of an MMT protocol according to an embodiment of the present invention.

FIG. 28 shows a matching relationship between an ID attribute and a message attribute of an event element for signaling all trigger properties as one event and an ID field and a message data field of an event message box according to an embodiment of the present invention.

As described above, one MPEG-DASH event can signal all properties that can be included in a trigger. Specifically, a message of an MPEG-DASH event may include at least one of an ID identifying a triggered application, an ID identifying a triggering event, an ID identifying data, a triggering event start time and a triggering event end time.

Here, the ID attribute of the event element may indicate an ID identifying triggering application information. Further, the message included in the event element may include a trigger. Specifically, the message included in the event element may include a trigger in the aforementioned form. In addition, the message included in the event element may be a trigger in a timed text form.

Furthermore, the ID field of the event message box may indicate an ID identifying triggering application information. Further, the message data field included in the event message box may include a trigger. Specifically, the message data field included in the event message box may include a trigger in the aforementioned form. In addition, the message data field included in the event message box may include a trigger in a timed text form.

Accordingly, the broadcast transmission device 10 may transmit a plurality of trigger properties through one MPEG-DASH even message. The broadcast reception device 10 may acquire a plurality of trigger properties through one MPEG-DASH event message.

Furthermore, a trigger may be signaled through the MMT protocol. This will be described below with reference to the attached drawings.

FIG. 29 shows a structure of a package of the MMT protocol according to an embodiment of the present invention.

As described above, the MMT protocol can be used as a protocol for transmitting media content in hybrid broadcast. Transmission of media content through the MMT protocol will be described through a package, an asset, a media processing unit (MPU) and presentation information (PI).

The package is a logical transmission unit of content transmitted through the MMT protocol. Specifically, the package can include the PI and the asset.

The asset is an encoded media data unit included in the package. In a specific embodiment, the asset may indicate an audio track included in content. Further, the asset may represent a video track included in content. The asset may indicate a captioning track included in content. The asset may include one or more MPUs.

The MPU is a media processing unit of content transmitted through the MMT protocol. Specifically, the MPU may include a plurality of access units. Further, the MPU may include data in a different format such as MPEG-4 AVC or MPEG-TS.

The PI is media content presentation information described above. Specifically, the PI may include at least one of spatial information and temporal information necessary to consume the asset. In a specific embodiment, the PI may be composition information defined in ISO-IEC 23008-1.

The broadcast transmission device 10 may transmit the package in an MMTP packet corresponding to a transmission unit of the MMT protocol. Data types included in a payload of the MMTP packet will be described with reference to the following figure.

Figure 30:
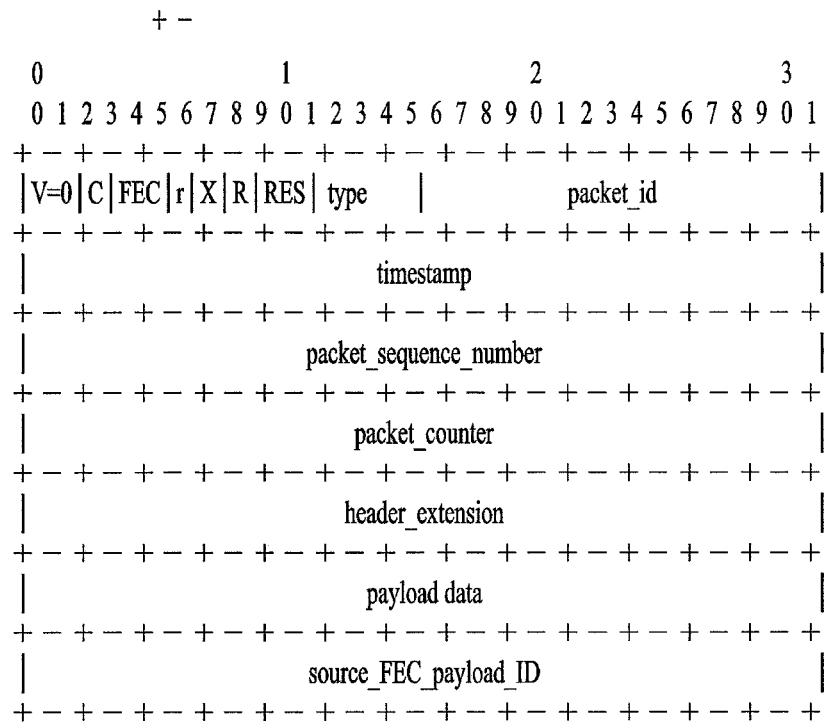
FIG. 30 shows a structure of an MMTP packet and data types included in the MMTP packet according to an embodiment of the present invention.

FIG. 30 shows a structure of an MMTP packet and data types included in the MMTP packet according to an embodiment of the present invention.

The MMTP packet according to an embodiment of the present invention may have the structure shown in FIG. 30(a). Particularly, the MMTP packet can represent the type of data included therein through a type field.

The MMTP packet may include a fragment of the MPU in the payload. Further, the MMTP packet may include a generic object indicating general data in the payload. Specifically, the generic object may be one complete MPU. Further, the generic object may be an object of a different type. The MMTP packet may include a signaling message in the payload. Specifically, the MMTP packet may include one or more signaling messages. Further, the MMTP packet may include a fragment of a signaling message. The signaling message may be a unit of signaling information that signals media content transmitted through the MMT protocol. The MMTP packet may include one repair symbol. In a specific embodiment, the broadcast transmission device 10 can transmit application signaling information through the MMTP packet including a fragment of the MPU. Specifically, the broadcast transmission device 10 can transmit a trigger through the MMTP packet including a fragment of the MPU.

Figures 31, 32:
FIG. 31 shows a syntax of an MMTP payload header when the MMTP packet includes a fragment of an MPU according to an embodiment of the present invention.
FIG. 32 shows synchronization of content with a trigger transmitted through an MPU according to an embodiment of the present invention.

FIG. 31 shows a syntax of an MMTP payload header when the MMTP packet includes a fragment of the MPU according to an embodiment of the present invention.

When the MMTP packet includes a fragment of the MPU, the payload header of the MMTP packet may include a length field indicating length information of the payload of the MMTP packet. In a specific embodiment, the length field may be referred to as "length". In a specific embodiment, the length field is a 16-bit field.

When the MMTP packet includes a fragment of the MPU, the payload header of the MMTP packet may include a type field indicating the type of the MPU included in the payload of the MMTP packet. Specifically, when the MMTP packet includes a fragment of the MPU, the payload of the MMTP packet may include at least one of a media fragment unit, MPU metadata and movie fragment metadata. The MPU metadata may include ftyp, mmpu and moov of ISO BMFF and other boxes included among ftyp, mmpu and moov. The movie fragment metadata includes a moof box and a media data excluded mdat box. The media fragment unit may include at least one of a sample of media data and a sub-sample. Here, the media data may be one of timed media data and non-timed media data. In a specific embodiment, the type field may be referred to as FT. In a specific embodiment, the length field may be a 4-bit field.

When the MMTP packet includes a fragment of the MPU, the payload header of the MMTP packet may include a timed flag indicating whether the fragment of the MPU includes timed media. Specifically, when the value of the timed flag is 1, the timed flag can indicate that the MPU fragment included in the MMTP packet includes timed media. In a specific embodiment, the timed flag may be referred to as T. In a specific embodiment, the timed flag may be 1-bit flag.

When the MMTP packet includes a fragment of the MPU, the payload header of the MMTP packet may include a fragment indicator indicating fragment information of a data unit included in the payload. The data unit may represent the unit of data included in the payload of the MMTP packet. The payload of the MMTP packet may include one or more data units. In a specific embodiment, the fragment indicator may be referred to as f_i. In a specific embodiment, the fragment indicator may be a 2-bit field.

When the MMTP packet includes a fragment of the MPU, the payload header of the MMTP packet may include an aggregation flag indicating that the payload includes one or more data units. In a specific embodiment, the aggregation flag may be referred to as A. In a specific embodiment, the aggregation flag may be a 1-bit flag.

When the MMTP packet includes a fragment of the MPU, the payload header of the MMTP packet may include a fragment counter field indicating the number of fragments included in the same data unit included in the payload. When the aggregation flag indicates that one or more data units are included in the payload, the value of the fragment counter field may be 0. In a specific embodiment, the fragment counter field may be referred to as frqg_counter. In a specific embodiment, the fragment counter field may be an 8-bit field.

When the MMTP packet includes a fragment of the MPU, the payload header of the MMTP packet may include an MPU sequence field indicating a number of a sequence including the MPU fragment. In a specific embodiment, the MPU sequence field may be referred to as MPU_sequence_number.

When the MMTP packet includes a fragment of the MPU, the payload header of the MMTP packet may include a data unit length field indicating the length of a data unit. Specifically, when the payload of the MMTP packet includes one or more data units, the payload header of the MMTP packet may include the data unit length field indicating a data unit length. In a specific embodiment, the data unit length field may be referred to as DU_length. In a specific embodiment, the data unit length field may be a 16-bit field.

When the MMTP packet includes a fragment of the MPU, the payload header of the MMTP packet may include a data unit header field indicating a header of a data unit. The data unit header field has a format depending on the type of data included in the data unit. Specifically, the data unit header field may have a format depending on the value of the aforementioned type field. Transmission of application signaling information using this payload header syntax will be described with reference to the following figure.

FIG. 32 shows synchronization of content with a trigger transmitted through an MPU according to an embodiment of the present invention.

The broadcast transmission device 10 may transmit application signaling information through a track of ISO BMFF by transmitting the same through an MPU. Accordingly, the broadcast transmission device 10 can transmit the application signaling information such that the application signaling information is synchronized with content on a frame-by-frame basis. Specifically, the broadcast transmission device 10 can transmit the application signaling information through the aforementioned payload header syntax of the MMTP packet such that the application signaling information can be synchronized with content on a frame-by-frame basis. In a specific embodiment, the broadcast transmission device 10 can set the fragment type of the MPU to the media fragment unit, insert the application signaling information into the data unit payload and transmit the application signaling information. Further, the broadcast transmission device 10 may set the timed flag such that the timed flag indicates transmission of timed media. Specifically, the broadcast transmission device 10 can set the timed flag such that the timed flag indicates transmission of timed media when the application signaling information needs to be transmitted at a specific time like a trigger. When application signaling information included in a data unit is a trigger, the trigger may have the aforementioned form. In another specific embodiment, the trigger may have a timed text form. Further, the trigger may be XML. In addition, the trigger may include an application ID that identifies a triggered application. Further, the trigger may include a triggering event ID that identifies a triggering event. The trigger may include an action indicating an action of a triggered application. Further, the trigger may include a data ID that identifies data necessary for a triggering event. In addition, the trigger may include a triggering event start time. The trigger may include a triggering event end time. As described above, the broadcast reception device 10 can perform an action after the triggering event start time and before the triggering event end time. Specifically, the application signaling information can be synchronized with a movie fragment presented in a decided sequence at a decided time through the trigger. In a specific embodiment, the broadcast transmission device 10 may set the triggering event start time and triggering event end time on the basis of a media time in the movie fragment. Further, the broadcast transmission device 10 may set the triggering event start time and triggering event end time to relative time in the trigger. Otherwise, the broadcast transmission device 10 may set the triggering event start time and triggering event end time to time based on wall-clock provided through out-of-band. For example, the broadcast transmission device 10 can set the triggering event start time and triggering event end time to time based on wall-clock provided by CI. Further, the broadcast transmission device 10 may set the triggering event start time and triggering event end time to time based on wall-clock provided by timestamp descriptor ( ).

In the embodiment of FIG. 32, a first trigger (Trigger 1) is synchronized with a first movie fragment (Movie Fragment 1) and a second trigger (Trigger 2) is synchronized with a second movie fragment (Movie Fragment 2). Specifically, the first trigger signals the position of triggering application information according to the above-described trigger format and triggers a triggering event having a triggering event ID of 5 to be immediately executed for an application having an application ID of 7. The second trigger signals the position of triggering application information according to the above-described trigger format and triggers a triggering event having a triggering event ID of 3 to be executed between 77ee to 80ee for an application having an application ID of 8.

The broadcast transmission device 10 may transmit an application signaling message as a signaling message of the MMT protocol. This will be described with reference to the following figure.

FIG. 33 shows a syntax of an MIVIT signaling message according to another embodiment of the present invention.

The MMT signaling message according to an embodiment of the present invention may include a message ID identifying the signaling message. In a specific embodiment, the message ID may be referred to as message_id. In a specific embodiment, the message ID may be a 16-bit field.

In addition, the MMT signaling message may include version information indicating update history of the signaling message. In a specific embodiment, the version information may be referred to as "version". In a specific embodiment, the version information may be an 8-bit field.

The signaling message may include length information indicating the length of data included therein. The length information may be referred to as "length". In a specific embodiment, the length information may be a 16-bit or 32-bit field.

The signaling message may include extension information indicating later extension of the signaling message. The signaling message may include various types of information. This will be described with reference to the following figure.

FIG. 34 shows a relationship between a value of an ID identifying an MMT signaling message and data signaled by the MMT signaling message according to another embodiment of the present invention.

Specifically, the signaling message may be a PA message indicating information of all signaling tables. Here, the message ID may be 0x0000. The signaling message may be an MPI message including media content presentation information. Here, the message ID may be 0x0001 to 0x000F. The signaling message may be an MPT message including an MP table indicating information of an asset included in a package. Here, the message ID may be 0x0011 to 0x001F. Further, the signaling message may be a CRI message including a CRI table indicating synchronization information. Here, the message ID may be 0x0200. The signaling message may be a DCI message including a DCI table indicating device performance necessary to consume a package. Here, message ID may be 0x0201. Further, the signaling message may be an AL_FEC message indicating FEC information necessary to receive an asset. Here, the message ID may be 0x0202. The signaling message may be an HRBM message indicating a memory and end-to-end transmission delay necessary for the broadcast reception device 100. Here, the message ID may be 0x0203. To transmit application signaling information, the signaling message may be an application signaling message including application signaling information other than the aforementioned messages. The broadcast reception device 100 can identify the type of a message included in the signaling message through the above-described message ID. Here, the message ID may be 0x8000. The form of the application signaling message will be described with reference to the following figure.

FIG. 35 shows a syntax of a signaling message including application signaling information according to another embodiment of the present invention.

The application signaling message according to another embodiment of the present invention may include an application signaling table including application signaling information in the signaling message. In a specific embodiment, the signaling message may include a plurality of application signaling tables.

The application signaling message may include table number information indicating the number of application tables included in the application signaling message. In a specific embodiment, the table number information may be referred to as number_of_tables. The table number information may be an 8-bit field.

The application signaling message may include table ID information that identifies an application table included therein. In a specific embodiment, the table ID information may be referred to as table_id. The table ID information may be an 8-bit field.

The application signaling message may include table version information indicating signaling table update history. In a specific embodiment, the table version information may be referred to as table_version. In a specific embodiment, the table version information may be an 8-bit field.

The application signaling message may include table length information indicating the length of a signaling table. In a specific embodiment, the table length information may be referred to as table_length. In a specific embodiment, the table length information may be an 8-bit field. A detailed syntax of the application signaling table will be described with reference to the following figure.

FIG. 36 shows a syntax of an application signaling table including application signaling information according to another embodiment of the present invention.

The application signaling table according to another embodiment of the present invention may include an ID that identifies the application signaling table. In a specific embodiment, the ID may be called table_id. The ID may be an 8-bit field.

The application signaling table may include version information indicating application signaling table update history. In a specific embodiment, the version information may be called "version". In a specific embodiment, the version information may be an 8-bit field.

The application signaling table may include length information indicating the length thereof. In a specific embodiment, the length information may be called "length". In a specific embodiment, the length information may be a 16-bit field.

The application signaling table may include trigger type information indicating the type of a trigger included therein. The signaling table may include various types of triggers. This will be described with reference to the following figure.

FIG. 37 shows a relationship between trigger type information included in the application signaling table and trigger properties included in triggers according to another embodiment of the present invention.

A trigger included in the signaling table can signal the position of triggering application information. Here, the trigger type information may be 1. Further, the trigger included in the signaling table can signal the lifecycle of an application. Specifically, the trigger included in the signaling table can signal an application status. Here, the trigger type information may be 2. The trigger included in the signaling table can signal an application action. Here, the trigger type information may be 3. In addition, the trigger included in the signaling table can signal a media time of content. Here, the trigger type information may be 4. Further, the trigger included in the signaling table can include all types of information that can be included in the trigger. Here, the trigger type information may be 5. Description will be given with reference to FIG. 36.

In a specific embodiment, the trigger type information may be called trigger_type. In a specific embodiment, the trigger type information may be an 8-bit field.

Signaling information table may include text indicating a trigger. Specifically, the signaling information table may include character information indicating characters included in the trigger. In a specific embodiment, the signaling information table may include multiple pieces of character information. In a specific embodiment, the character information may be called URI_character. Further, the trigger may have the aforementioned form. In a specific embodiment, the character information may be an 8-bit field.

In the embodiment described with reference to FIGS. 36 and 37, trigger types are represented through the trigger type information in the application signaling message table. In this case, the broadcast reception device 100 needs to parse the application signaling table to recognize a trigger type. Accordingly, the broadcast reception device 100 cannot selectively receive only a necessary trigger. A method for solving this problem will be described with reference to the following figure.

FIG. 38 shows a relationship between a value of an ID identifying an MMT signaling message and data signaled by the MMT signaling message according to another embodiment of the present invention.

The broadcast transmission device 10 can set the message ID for identifying an application signaling message depending on the type of a trigger included in the application signaling message. Specifically, the broadcast transmission device 10 can set the message ID depending on whether the trigger is a trigger signaling the position of triggering application information, a trigger signaling an application lifecycle, a trigger signaling an application action, a trigger signaling a content media time or a trigger including all trigger information. Specifically, when the message ID is 0x8000 to 0x8004, the message ID can indicate that the signaling message is an application signaling message. In a specific embodiment, when a trigger included in the application signaling message signals the position of triggering application information, the message ID may be 0x8000. When the trigger included in the application signaling message signals an application lifecycle, the message ID may be 0x8001. When the trigger included in the application signaling message signals an application action, the message ID may be 0x8002. When the trigger included in the application signaling message signals a content media time, the message ID may be 0x8003. When the trigger included in the application signaling message includes all trigger information, the message ID may be 0x8004. Since the message ID of the signaling message indicates the type of a trigger included in the application signaling message, the application signaling table may not include the trigger type information. In the embodiment of FIG. 39, the application signaling table does not include the trigger type information differently from the aforementioned application signaling table.

When the message ID identifying the application signaling message is set depending on the type of a trigger included in the signaling message, as described above, the broadcast reception device 100 can recognize a trigger type without parsing the application signaling table included in the application signaling message. Accordingly, the broadcast reception device 100 can selectively receive a specific type of trigger efficiently.

The broadcast transmission device 10 can transmit the application signaling information through a generic packet. This will be described with reference to the following figure.

FIG. 40 shows a structure of an MMTP packet according to another embodiment of the present invention.

First of all, the syntax of the MMTP packet will be described.

The MMTP packet may include version information indicating the version of the MMTP protocol. In a specific embodiment, the version information may be referred to as V. In a specific embodiment, the version information may be a 2-bit field.

The MMTP packet may include packet counter flag information indicating presence of packet counting information. In a specific embodiment, the packet counter flag information may be referred to as C. In a specific embodiment, the packet counter flag information may be a 1-bit field.

The MMTP packet may include FEC type information indicating a scheme of an FEC algorithm for preventing errors in the MMTP packet. In a specific embodiment, the FEC type information may be referred to as FEC. In a specific embodiment, the FEC type information may be a 2-bit field.

The MMTP packet may include extension flag information indicating presence of header extension information. In a specific embodiment, the extension flag information may be referred to as X. In a specific embodiment, the extension flag information may be a 1-bit field.

The MMTP packet may include RAP (Random Access Point) flag information indicating whether an RAP for data random access of a payload is included. In a specific embodiment, the RAP flag information may be referred to as R. In a specific embodiment, the RAP flag information may be a 1-bit field.

The MMTP packet may include type information indicating a data type of the payload. In a specific embodiment, the type information may be referred to as type. In a specific embodiment, the type information may be a 6-bit field.

The MMTP packet may include packet ID information indicating an ID identifying the packet. The broadcast reception device 100 can determine an asset including the corresponding packet on the basis of the packet ID information. Further, the broadcast reception device 100 can acquire a relationship between the asset and the packet ID from the signaling message. The packet Id information may have a unique value for the lifetime of the corresponding transport session. In a specific embodiment, the packet ID information may be referred to as packet_id. In a specific embodiment, the packet ID information may be a 16-bit field.

The MMTP packet may include packet sequence number information indicating a packet sequence number. In a specific embodiment, the packet sequence number information may be referred to as packet_sequence_number. In a specific embodiment, the packet sequence number information may be a 32-bit field.

The MMTP packet may include timestamp information that specifies a time instance value of MMTP packet transmission. The timestamp information may be based on a UTC value. Further, the timestamp information may represent a time when the first byte of the MMTP packet is transmitted. In a specific embodiment, the timestamp information may be referred to as timestamp. In a specific embodiment, the timestamp information may be a 32-bit field.

The MMTP packet may include packet counting information indicating a count of transmitted packets. In a specific embodiment, the packet counting information may be referred to as packet_counter. In a specific embodiment, the packet counting information may be a 32-bit field.

The MMTP packet may include FEC information which is necessary according to an FEC protection algorithm. In a specific embodiment, the FEC information may be referred to as Source_FEC_payload ID. In a specific embodiment, the packet counting information may be a 32-bit field.

The MIVITP packet may include reserved header extension information for later header extension. In a specific embodiment, the header extension information may be referred to as header_extension.

The broadcast transmission device 10 can insert application signaling information into a generic type packet. Specifically, the broadcast transmission device 10 can insert the application signaling information into a payload of the generic type packet in the form of a file and transmit the application signaling information. Here, the broadcast transmission device 10 can allocate different packet IDs to files. The broadcast reception device 100 can extract the application signaling information from the generic packet. Specifically, the broadcast reception device 100 can extract a file including the application signaling information from the generic packet. Specifically, the broadcast reception device 100 can extract the file including the application signaling information on the basis of the packet ID of the generic packet. For example, the broadcast reception device 100 can determine whether the packet includes necessary application signaling information on the basis of the packet ID of the generic packet.

The broadcast transmission device 10 may transmit the application signaling information using the header extension information of the MMTP packet. This will be described with reference to the following figure.

FIG. 41 shows a structure of an MMTP packet and a syntax of a header extension field for application signaling information transmission according to another embodiment of the present invention.

The broadcast transmission device 10 may insert the application signaling information into the header of the MMTP packet and transmit the same. Specifically, the broadcast transmission device 10 may insert the application signaling information into the header extension information and transmit the same.

In a specific embodiment, the header extension information may include header extension type information indicating the type of header extension information included therein. Here, the header extension type may indicate that the header extension information includes an application signaling message. In another specific embodiment, the header extension type information may indicate the type of application signaling information included in the header extension information. Here, the type of application signaling information may include a trigger type depending on the aforementioned trigger property. In a specific embodiment, the header extension type information may be referred to as type.

In a specific embodiment, the header extension information may be a 16-bit field. In a specific embodiment, the header extension information may include header extension length information indicating the length of the header extension information. Here, the header extension length information may indicate the length of the application signaling information included in the header extension information. In a specific embodiment, the header extension length information may be referred to as length. In a specific embodiment, the header extension information may be a 16-bit field.

In a specific embodiment, the header extension information may include a header extension value indicating extension information included therein. Here, the header extension value may represent application signaling information included in the header extension information. Here, the application signaling information may be a trigger. Further, the type of the application signaling information may be a URI in a string form. The URI in a string form may be the aforementioned string type trigger. In a specific embodiment, the header extension value may be referred to as header_extension_value.

Accordingly, the broadcast reception device 100 can extract the application signaling information from the header extension information. Specifically, the broadcast reception device 100 can extract the application signaling information on the basis of the header extension type information included in the header extension information. Specifically, the broadcast reception device 100 can determine whether the header extension information includes the application signaling information on the basis of the header extension type information. The broadcast reception device 100 can extract the application signaling information when the header extension information includes the application signaling information. Further, the broadcast reception device 100 can determine the type of the application signaling information included in the header extension information on the basis of the header extension type information. Accordingly, the broadcast reception device 10 can selectively acquire the application signaling information.

Description will be given of operations of the broadcast transmission device 10 and the broadcast reception device 100 according to transmission and reception of application signaling information in accordance with the above-described embodiments of the present invention with reference to the following figures.

Figure 42:
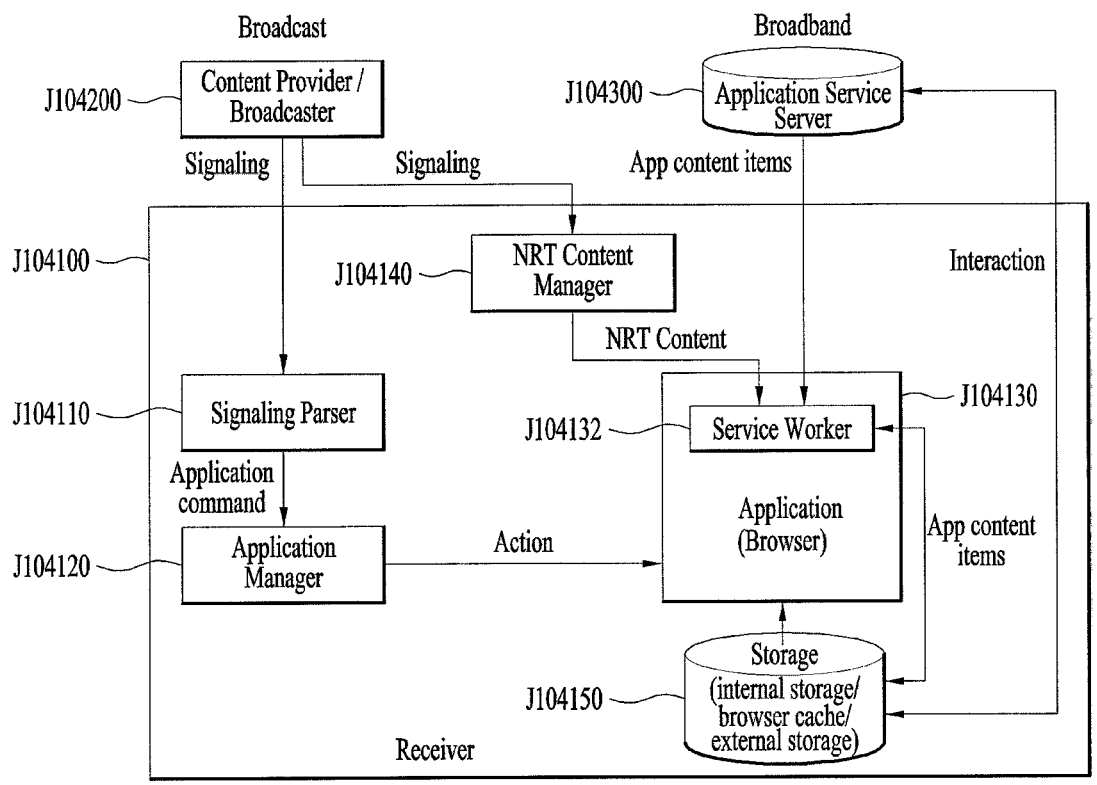
FIG. 42 shows part of a broadcast system according to an embodiment of the present invention.

FIG. 42 shows part of a broadcast system according to an embodiment of the present invention.

In a future hybrid broadcast system, an interactive application related to broadcast programs may be delivered through a broadcast network or the Internet and provided to users. To deliver the interactive application to a receiver, a service worker, one type of web workers of HTML5 which can be generally used in a browser environment, may be used.

The service worker may automatically store content items related to the interactive application in a storage of the receiver depending on characteristics of type of the interactive application. Otherwise, the content items related to the application may be stored in the receiver by a user.

The receiver can provide a mechanism that can operate similarly to a package application or a widget through the service worker and can drive applications even in an offline state such as an Internet-disconnected state.

An embodiment of the present invention relates to a method of installing the interactive application in the receiver through the service worker and/or interworking with addLink( ) API to provide application management functions such as execution, termination, update and/or deletion of the interactive application when a user wants.

The broadcast system according to an embodiment of the present invention includes a receiver J104100, a content provider/broadcaster J104200 and/or an application service server J104300.

The receiver J104100 may include a signaling parser J104110, an application manager J104120, an application browser (or an application processor) J104130, a service worker J104132, a (non-real-time) NRT content manager J104140 and/or a storage J104150.

The signaling parser J104110 is a device or a module for parsing a signal sent from the content provider/broadcaster. The signal may include signaling information (or signaling data) and/or content. The signaling information including application related information is acquired. The signaling information may include command information for identifying a command related to application execution.

The application manager J104120 is a device or a module for managing an application when the application is present after the signal is parsed. The application manager J104120 generates a control signal with respect to an application action using information included in the signaling information.

The application browser (or application processor) J104130 is a device or a module for performing a process for executing an application. The application browser J104130 processes the application according to a control signal. The application browser J104130 can perform interactive communication between the receiver and a server (or broadcaster), which is necessary for a procedure through which the application is provided to a user.

The service worker J104132 may be included in the application browser or included as a separate device in the receiver. The service worker J104132 is a module or a device for managing downloading of NRT content or application related information from a server provided by the content provider/broadcaster.

The NRT content manager J104140 is a module or a device for managing non-real-time (NRT) content. The NRT content manger J104140 processes NRT content transmitted in non real time.

The storage J104150 is a device storing data. The storage used in the present invention may include an internal storage of the receiver, a cache in a browser for driving the interactive application and/or an external storage (e.g., external USB storage) connected to the receiver. The storage J104150 provides applications and/or signaling information stored therein to the service worker J104132 or the application browser J104130. The storage J104150 can receive and store an application through interactive communication with the application service server.

The application used in the present invention may correspond to an application provided by the content provider/broadcaster. The application may provide an independent service or may be combined with broadcast content to provide a service with higher quality to users. The application can operate by activating (or launching), suspending, resuming or terminating (or exiting) actions.

The content provider/broadcaster J104200 provides content in the broadcast system. The content provider/broadcaster J104200 can deliver signaling information related to the application to the receiver. The content provider/broadcaster J104200 can transmit signaling information and/or NRT content to the receiver through an NRT transmission network. The NRT content may include broadcast content and/or the application.

The application service server J104300 is a server providing data related to the application.

Figure 43:
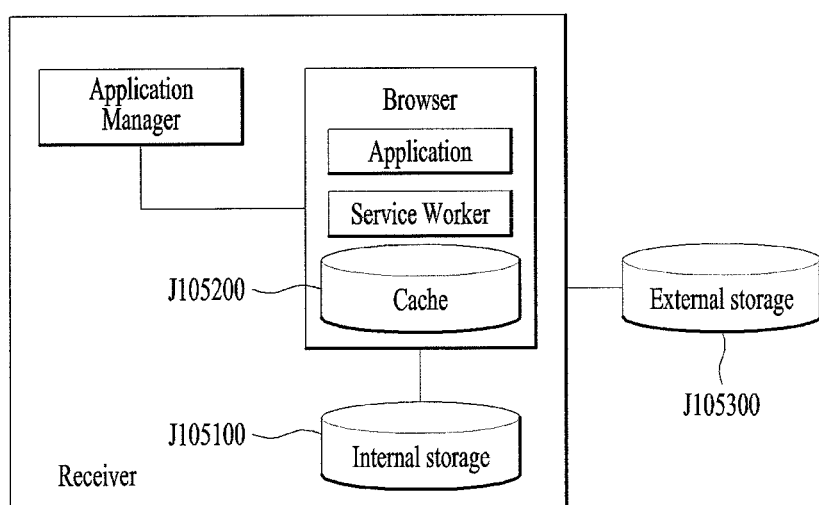
FIG. 43 shows an example in which a storage is included in a broadcast system according to an embodiment of the present invention.

FIG. 43 shows an example in which a storage is included in the broadcast system according to an embodiment of the present invention.

The storage may be included in the broadcast system as an internal storage J105100, a cache memory J105200 and/or an external storage J105300.

The internal storage J105100 may correspond to a storage device included in the receiver.

The cache memory J105200 may correspond to a storage device included in the application browser.

The external storage J105300 may be a storage device outside the receiver and may correspond to a general external storage device, a server or a cloud storage. When the external storage J105300 corresponds to the server or cloud storage, the receiver and the external storage are connected through networking and the receiver can rapidly receive data about an application at the request of a receiver user.

Figure 44:
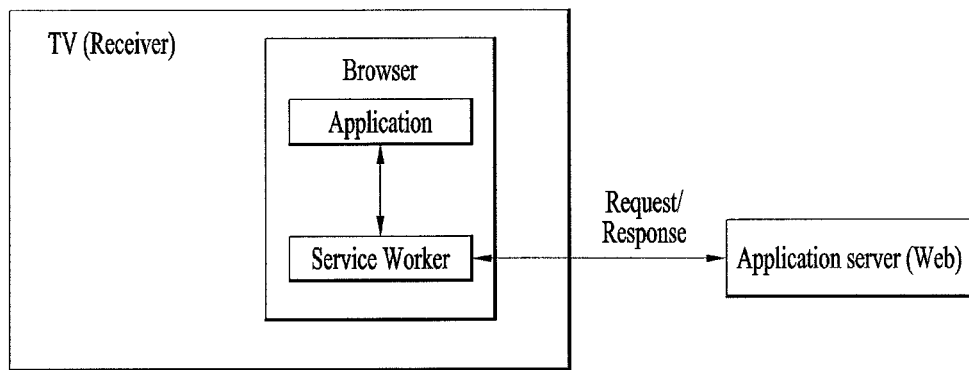
FIG. 44 shows operation of a service worker according to an embodiment of the present invention.

FIG. 44 shows operation of the service worker according to an embodiment of the present invention.

The service worker, a web worker of HTML5, can be driven by the application browser that can execute an application in the receiver. The service worker may be created to be activated when an initial application is executed or when a user wants. The service worker may be positioned between the application server and a web application executed in the receiver to serve as a proxy for a network request transmitted to the application server. When the service worker is activated, the service worker processes a request for application content items when the application executed in the receiver sends the request to the application server. The service worker can receive and/or process a response from the application server.

The application content items may refer to the application or subsidiary content necessary to present the application.

Figure 45:
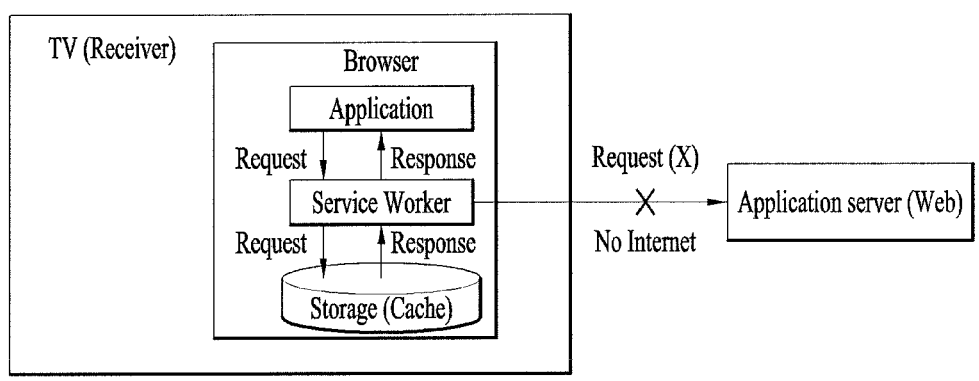
FIG. 45 shows operation of a service worker in an offline state according to an embodiment of the present invention.

FIG. 45 shows operation of the service worker in an offline state according to an embodiment of the present invention.

The advantage of the service worker as a proxy role is that the service worker can store all or some application content items on the application server in a cache.

The cache can be used differently from a cache generally used in a browser, and the cache defined in the service worker can be completely manually controlled.

As shown, the receiver can execute an application even when the receiver is not connected to the Internet using application content items downloaded from the application server and stored in the cache by the service worker. In this case, the application browser can deliver a request for the application content items to the service worker and the service worker can check whether application content items suitable for the request are present in the cache and deliver corresponding data to the application browser.

FIG. 46 shows an application program interface (API) and metadata used for a receiver to execute an application according to an embodiment of the present invention.

As described above, the interactive application can be installed in the receiver and provided to a user. When application content items for the interactive application in a web application form are stored in a database (DB) (or a storage) or a cache by the service worker, the receiver can execute the interactive application like a widget even in an offline state (i.e., the Internet is not connected). The interactive application can call addLink( ) API of the application manager of the receiver. Here, the application manger provides metadata related to the application to the application browser or the service worker such that the receiver can configure a page or a menu for a link.

When the user is viewing a program through the receiver, application notification indicating presence of the interactive application related to the program may be displayed on the screen. The user inputs a command for executing the application to the receiver. The service worker in the receiver may be registered or may register the application or the user command. An install button may be displayed during execution of the application and the user may install the application by selecting the install button. The service worker may control application content items to be downloaded and stored in a storage (an internal storage, an external storage or a cache). An application registration procedure of the service worker may include application installation and/or application activation. The application may call addLink( ) API of the application manager of the receiver. When the addLink( ) API is called, related metadata may be delivered to the application manager of the receiver such that the application manager can configure an application widget page. The application manager of the receiver may configure an application collection page and/or menu using the delivered metadata. Users may order operations of executing, terminating, updating and/or deleting installed applications using the application collection page or menu. When a user executes an installed application, the user may call the URL of the application. When application content items corresponding to the URL are stored in the storage, the service worker may load the application content items from the storage.

The URL of the interactive application in a web application form may be stored in the receiver. The interactive application calls the addLink( ) API of the application manage of the receiver, and metadata related to the application may be delivered to the application manger such that the receiver can configure a page or a menu for a link.

When a user is viewing a program through the receiver, application notification indicating presence of the interactive application related to the program may be displayed on the screen. The user inputs a command for executing the application to the receiver. The service worker may not be registered. In this case, the service worker may not download application content items which will be used in an offline state. The install button may be displayed during execution of the application and the user may input a command for selecting the install button to the receiver. The application may call the addLink( ) API of the application manager. When the addLink( ) API is called, related metadata may be delivered from the application such that the application manager of the receiver can configure an application link page. The application manager of the receiver may configure an application collection page or menu using the delivered metadata. Users may input a command for executing, terminating, updating and/or deleting installed applications to the receiver. A user may control link to the URL of an installed application to be executed to load application content items.

Table (a) of the figure shows an embodiment of addLink( ) API of the application manager. When the addLink( ) API is successfully called, the receiver adds a link to a list of links. The integer returns a value indicating whether the API has been successfully called and, when calling fails, returns a value indicating the reason of failure. The addLink( ) may be called application link information. The application link information includes a link and/or application property information necessary to execute an application.

The addLink( ) may include URI information and/or linkmetadata information.

The URI information indicates a URI value of a URL stored as a link. The URI information may indicate a URL stored as a link for an application.

The linkmetadata information includes metadata related to a link. The linkmetadata information will be described in detail below.

Table (b) of the figure shows values returned by the addLink( ) APO and definition thereof. When "0" is returned, this value indicates successful calling and addition of a link. When "1" is returned, this value indicates that calling fails because the syntax of URI information is not valid. When "2" is returned, this value indicates that calling fails because the linkmetadata information is not valid. When "3" is returned, this value indicates that calling fails because the number of stored links exceeds a permitted limit.

Table (c) of the figure shows a schema table of the linkmetadata information. The linkmetadata information may include @url information, @title information, @majChanNum information, @minChanNum information, @channelName information, @programName information, @expiration information, @packagedApp information, @description information, a Param element, @title information, @description information, an Icon element, @source information, @width information and/or @height information.

The @url information indicates a URL related to a link. The @url information may represent the URL of an object indicated by a link.

The @title information indicates a link title displayed to a user.

The @majChanNum information indicates a major channel number of a virtual channel for which a link is provided. When the link is provided through an NRT service, this information can indicate some values (e.g., upper 8 bits) of service_id information of the NRT service included in a service map table (SMT).

The @minChanNum information indicates a minor channel number of a virtual channel for which a link is provided. When the link is provided through an NRT service, this information can indicate some values (e.g., lower 8 bits) of service_id information of the NRT service included in the service map table (SMT).

The @channelName information indicates a short_name of a virtual channel for which a link is provided. When the link is provided through an NRT service, this information can indicate the same information as short_service_name information of the NRT service included in the service map table (SMT).

The @programName information indicates title_text (a title represented by characters) of a program (e.g., a PSIP event, a broadcast program, a broadcast event or an event in an application) for which a link is provided.

The @expiration information indicates an expiration date at which a link become invalid.

The @packagedApp information indicates whether a linked URL corresponds to a widget or a packaged application. The receiver can recognize whether the linked URL is a link for acquiring an application or a widget using this information. When the receiver is not connected to the Internet and the linked URL corresponds to the link for acquiring an application, application management such that shading may be performed such that the application cannot be executed.

The @description information indicates description about an application.

The Param element may be used to indicate a query string following a URL for a link to an application. For example, in a URL of http(s)://app.example.com/index.html?type=value, "type=value" may correspond to the Param element. For example, applications may be discriminated by Param element values although they use the same URL. The application manager of the receiver may use the Param element to group or search for applications associated with the same broadcaster or the same program. A broadcaster or a content provider can efficiently manage applications by discriminating the applications using Param element values without assigning different URLs to the applications.

The @title information indicates a title for the Param element.

The @description information indicates description about the Param element.

The Icon element identifies an icon file used to indicate a link in a display of links to a user. A plurality of icon files may be present. For example, icon files having different sizes or indicating the same link may be present. One of such icon files may be displayed according to situation.

The @source information indicates a URL of an image file for an icon indicated by the Icon element.

The @width information indicates the width of an icon image in pixel units.

The @height information indicates the height of an icon image in pixel units.

Figure 47:
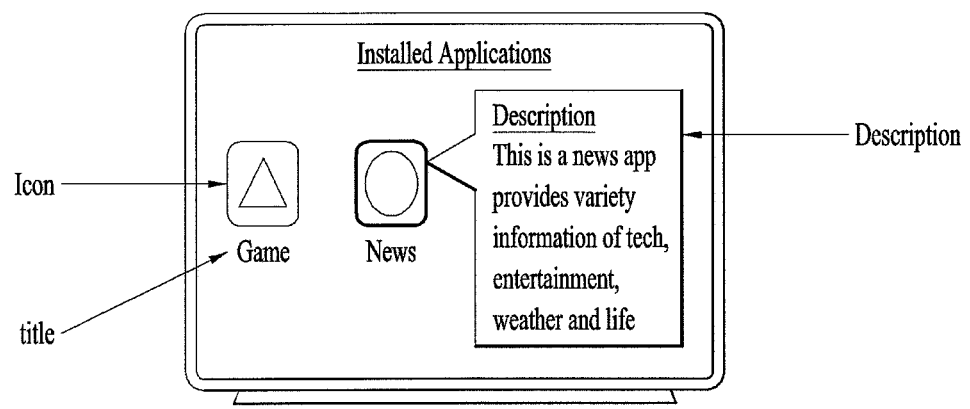
FIG. 47 shows a user interface (UI) with respect to an application or a link for an application according to an embodiment of the present invention.

FIG. 47 shows a user interface (UI) with respect to an application or a link for an application according to an embodiment of the present invention.

The receiver may provide a UI through which a user can select a desired application or a link providing the application.

The aforementioned information included in the addLink( )may be used when the receiver provides the UI. For example, the receiver can display an icon for an application or a link for the application using the Icon element, @source information, @width information and/or @height information. The receiver can display a title of an application or a link for the application using the @title information. The receiver can display information describing an application or a link in the UI using the @description information.

Figure 48:
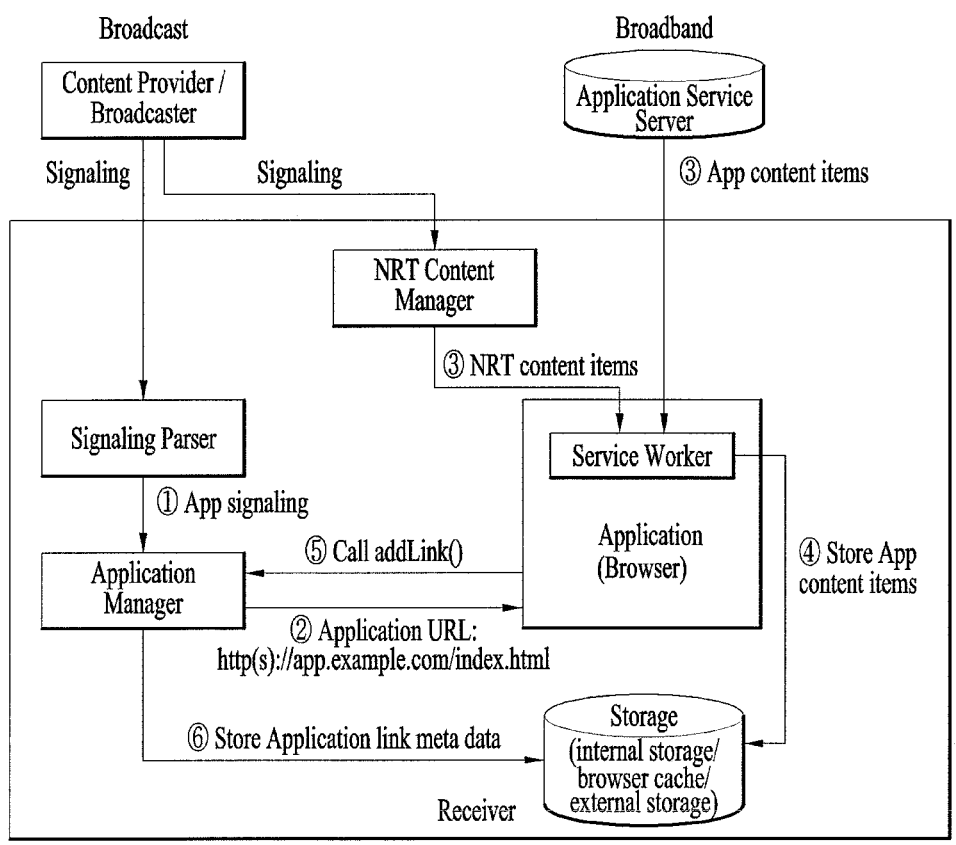
FIG. 48 shows a process through which a receiver installs and executes an application in the form of a widget according to an embodiment of the present invention.

FIG. 48 shows a process through which a receiver installs and executes an application in the form of a widget according to an embodiment of the present invention.

An application in the form of a widget may be installed and executed using the service worker and the addLink( ) API.

When the URL of an interactive application is http(s)://app.example.com/index.html, there may be multiple links (or URLs) for application content items included in the application, as shown.

The receiver may receive signaling information related to the application. The receiver may deliver the signaling information related to the application to the application manager (step 1).

The application manger may acquire the URL of the application included in the signaling information and execute the application (step 2).

After execution of the application URL, application content items may be downloaded through a broadcast network and/or the Internet when the service worker is registered automatically or by a user (step 3).

The service worker may store the application content items in a storage (internal storage/browser cache/external storage) after downloading the application content items (step 4).

The application (or application browser) may call addLink( ) and deliver metadata related to the link of the application to the application manger (step 5).

The application manager may store the delivered metadata in the storage (internal storage/browser cache/external storage) (step 6).

Figure 49:
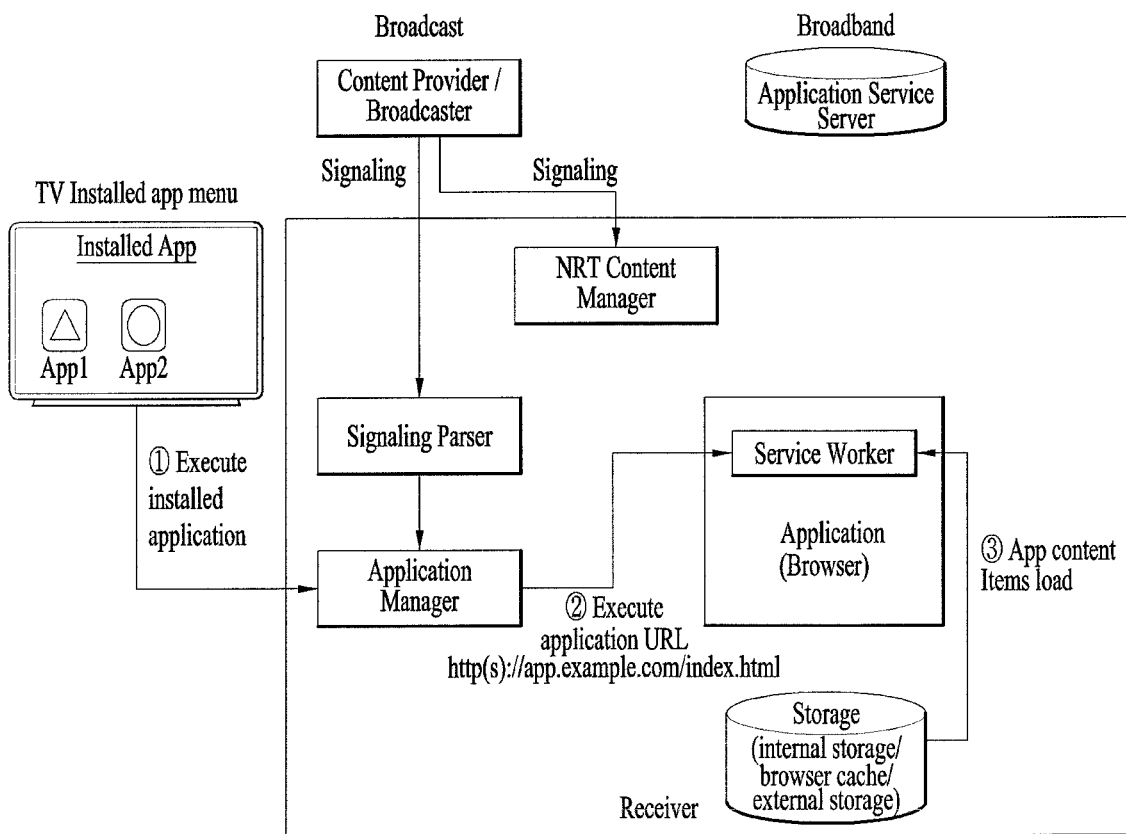
FIG. 49 shows a process through which a user executes an application upon installation of the application according to an embodiment of the present invention.

FIG. 49 shows a process through which a user executes an application upon installation of the application according to an embodiment of the present invention.

The URL of the application may be http(s)://app.example.com/index.html and URLs or links of application content items may be as shown in the figure.

A user may input a command for executing the application to the receiver through an installed app menu in the receiver. The installed app menu may be implemented in the form of a UI using metadata included in addLink( ), as described above (step 1).

The application manger may execute the application URL. The application manager may execute the application indicated by the URL. When the user select a specific application, the application manger may be configured to acquire the URL corresponding to the selected application and to execute the application corresponding to the URL (step 2).

In a process through which the application or browser loads the application URL, the service worker is driven to load application content items stored in the storage. Since all application content items for application execution are stored in the storage, the receiver can normally operate the application even when the receiver is not connected to the Internet.

As described above, according to the embodiments of the present invention, the broadcast receiver can correctly execute a desired application of a viewer at an appropriate time even when the broadcast receiver is not connected to the Internet or does not receive data related to the application through the current broadcast network, in application execution in the broadcast receiver.

Figure 50:
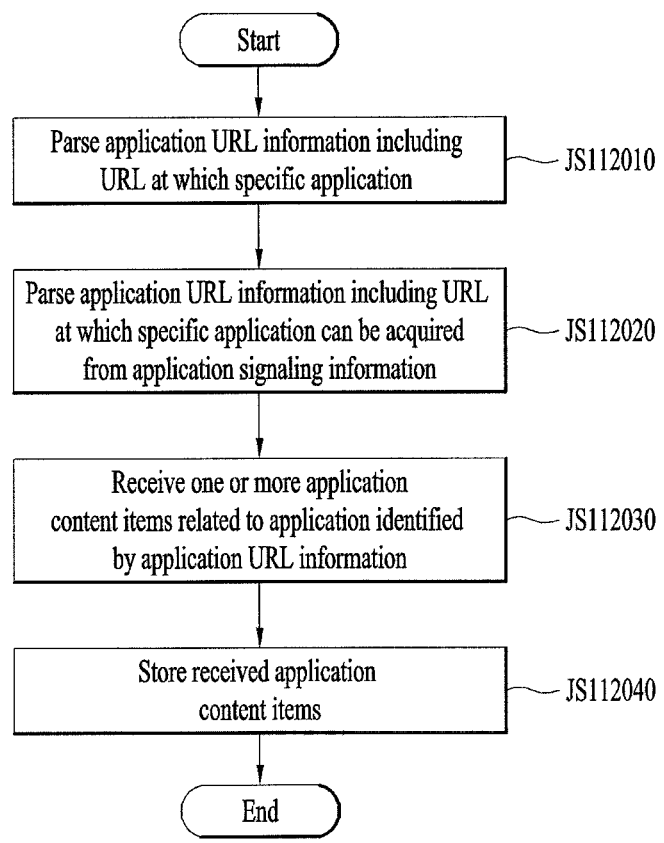
FIG. 50 is a flowchart illustrating a method of executing an application by a broadcast receiver according to an embodiment of the present invention.

FIG. 50 is a flowchart illustrating a method of executing an application by a broadcast receiver according to an embodiment of the present invention.

The broadcast receiver receives application signaling information including information about an application (JS112010). The application signaling information may be included in a broadcast signal and transmitted, and the broadcast receiver may parse the application signaling information from the broadcast signal.

The broadcast receiver parses application URL information including a URL at which a specific application can be acquired from the application signaling information (HS112020).

The broadcast receiver receives one or more application content items related to the application identified by the application URL (JS112030).

The broadcast receiver stores the received application content items (JS112040).

FIG, 51 shows a TI operation for VBR transmission.

Figure 51:
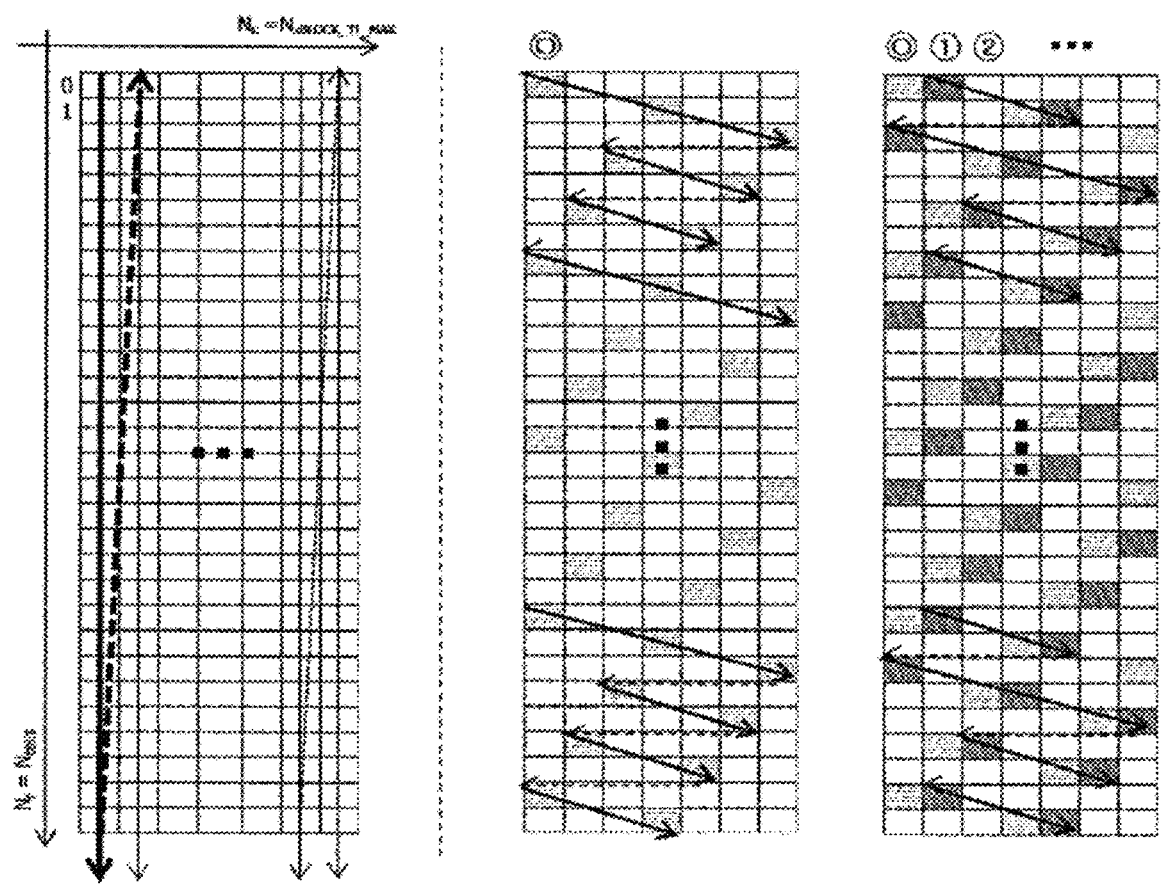
FIG. 51 shows a TI operation for VBR (Variable Bit-Rate) transmission.

As shown in FIG. 51, a twisted row-column block interleaver may interleave a number of FEC blocks in a TI block based on writing and reading operations.

Figure 52:
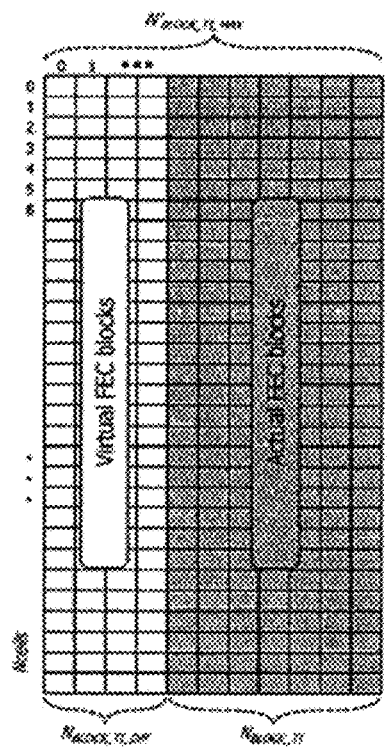
FIG. 52 shows a TI operation for VBR transmission.

FIG. 52 shows a TI operation for VBR transmission.

As shown in FIG. 52, in accordance with a twisted row-column interleaving rule, a virtual FEC block may be inserted in a TI block. Parameters for interleaving may be determined based on a TI block having a maximum number of FEC blocks and a number of FEC blocks. Virtual FEC blocks may be inserted in ahead of actual FEC blocks. This may provide effects of single memory deinterleaving operation.

All or some technical features described above may be added to each step of the method of executing an application by the broadcast receiver according to an embodiment of the present invention.

The module or unit may be one or more processors designed to execute a series of execution steps stored in the memory (or the storage unit). Each step described in the above-mentioned embodiments may be implemented by hardware and/or processors. Each module, each block, and/or each unit described in the above-mentioned embodiments may be realized by hardware or processor. In addition, the above-mentioned methods of the present invention may be realized by codes written in recoding media configured to be read by a processor so that the codes may be read by the processor supplied from the apparatus.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description may be configured in a manner of being selectively combined with one another entirely or in part to enable various modifications.

In addition, a method according to the present invention may be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes may be saved and executed according to a distributive system.

It will be appreciated by those skilled in the art that various modifications and variations may be made in the present invention without departing from the spirit or scope of the inventions. Thus, it is intended that the present invention covers the modifications and variations of this invention provided they come within the scope of the appended claims and their equivalents.

Both the product invention and the process invention are described in the specification and the description of both inventions may be supplementarily applied as needed.

It will be appreciated by those skilled in the art that various modifications and variations may be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The present invention is available in a series of broadcast signal provision fields.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A digital broadcast receiver for processing data of a broadcaster application, the digital broadcast receiver comprising:
   a tuner configured to receive a broadcast signal including video data for a broadcast program and application signaling information, wherein the application signaling information includes a URL (Uniform Resource Locator) of an entry page of the broadcaster application for providing an interactive service;
   a frequency deinterleaver configured to frequency deinterleave the video data and the application signaling information;
   a time deinterleaver configured to perform time deinterleaving selectively based on mode information,
   wherein the time deinterleaver comprises a twisted block deinterleaver,
   wherein the twisted block deinterleaver is configured to deinterleave one or more FEC (Forward Error Correction) blocks comprising the video data and the application signaling information interleaved by a TI (Time Interleaving) scheme,
   wherein the TI scheme comprises column-wisely writing the one or more FEC blocks and diagonal-wisely reading the one or more FEC blocks based on one or more virtual FEC blocks in at least one TI block;

a network interface configured to receive at least one content;

a cache configured to store the at least one content, wherein the broadcaster application is launched after the digital broadcast receiver receives the application signaling information and the URL is forwarded to a first module capable of processing HTML5, wherein the first module loads the entry page of the broadcaster application from the URL, and the URL is used to point to an external internet server or to a second module within the digital broadcast receiver; and a display configured to display notification for a specific application related to the broadcast program while displaying the broadcast program.

2. The digital broadcast receiver of claim 1, wherein the display is further configured to display an indicator for installing the specific application while executing the specific application.

3. The digital broadcast receiver of claim 2, wherein the specific application is executed even though the digital broadcast receiver is disconnected from an internet network.

4. The digital broadcast receiver of claim 3, wherein the digital broadcast receiver corresponds to a television.

5. A digital broadcast receiver for processing data of a broadcaster application, the digital broadcast receiver comprising:

a tuner configured to receive a broadcast signal including video data for a broadcast program and application signaling information, wherein the application signaling information includes a URL (Uniform Resource Locator) of an entry page of the broadcaster application for providing an interactive service;

a frequency deinterleaver configured to frequency deinterleave the video data and the application signaling information;

a time deinterleaver configured to perform time deinterleaving selectively based on mode information, wherein the time deinterleaver comprises a twisted block deinterleaver, wherein the twisted block deinterleaver is configured to deinterleave one or more FEC (Forward Error Correction) blocks comprising the video data and the application signaling information interleaved by a TI (Time Interleaving) scheme, wherein the TI scheme comprises column-wisely writing the one or more FEC blocks and diagonal-wisely reading the one or more FEC blocks based on the maximum number of at least one TI block that is acquired based on the number of the one or more FEC blocks;

a network interface configured to receive at least one content;

a cache configured to store the at least one content, wherein the broadcaster application is launched after the digital broadcast receiver receives the application signaling information and the URL is forwarded to a first module capable of processing HTML5, wherein the first module loads the entry page of the broadcaster application from the URL, and the URL is used to point to an external internet server or to a second module within the digital broadcast receiver; and a display configured to display a menu for installed applications, wherein the menu comprises an icon or a title for each of the installed applications.

6. The digital broadcast receiver of claim 5, wherein the display is further configured to display description information for a specific application among the installed applications.

7. The digital broadcast receiver of claim 6, wherein the specific application is executed even though the digital broadcast receiver is disconnected from an internet network.

8. The digital broadcast receiver of claim 7, wherein the digital broadcast receiver corresponds to a television.

* * * * *